(12) United States Patent
Gamliel et al.

(10) Patent No.: US 10,969,301 B2
(45) Date of Patent: Apr. 6, 2021

(54) SELF-ADMINISTRATED TESTING OF EYEGLASSES

(71) Applicant: SHAMIR OPTICAL INDUSTRY LTD., Upper Galilee (IL)

(72) Inventors: Avihu Meir Gamliel, Pardes-Hana (IL); Zohar Katzman, Haifa (IL); Amos Netzer, Kibbutz Ramat-Yohanan (IL); Yotam Gil, Kiryat Tiv'on (IL); Meirav Metzger Moshe, Kibbutz Ramat-Yohanan (IL); Shai Michael, Kibbutz Ramat-Yohanan (IL)

(73) Assignee: SHAMIR OPTICAL INDUSTRY LTD., Upper Galilee (IL)

( * ) Notice: Subject to any disclaimer, the term of this patent is extended or adjusted under 35 U.S.C. 154(b) by 162 days.

(21) Appl. No.: 16/077,668

(22) PCT Filed: Feb. 12, 2016

(86) PCT No.: PCT/IB2016/050771
§ 371 (c)(1),
(2) Date: Aug. 13, 2018

(87) PCT Pub. No.: WO2017/137810
PCT Pub. Date: Aug. 17, 2017

(65) Prior Publication Data
US 2020/0072702 A1 Mar. 5, 2020

(51) Int. Cl.
*G01M 11/02* (2006.01)
*G01N 21/958* (2006.01)
*G02C 7/02* (2006.01)

(52) U.S. Cl.
CPC .... *G01M 11/0285* (2013.01); *G01M 11/0278* (2013.01); *G01N 21/958* (2013.01); *G01N 2021/9583* (2013.01); *G02C 7/022* (2013.01)

(58) Field of Classification Search
CPC .......... G01M 11/0278; G01M 11/0285; G01N 2021/9583; G01N 21/958; G02C 7/022
USPC ................................................. 356/124–137
See application file for complete search history.

(56) References Cited

U.S. PATENT DOCUMENTS

| | | | |
|---|---|---|---|
| 5,307,096 A | 4/1994 | Baroth et al. | |
| 5,331,391 A | 7/1994 | Bukhshtab | |
| 5,339,151 A * | 8/1994 | Shinn | G01M 11/0285 250/372 |
| 7,434,931 B2 | 10/2008 | Warden et al. | |
| 8,242,924 B2 | 8/2012 | Huang et al. | |
| 8,976,250 B2 | 3/2015 | Armstrong-Muntner et al. | |
| 2008/0111989 A1 | 5/2008 | Dufour et al. | |
| 2008/0268900 A1 | 10/2008 | Lee | |
| 2015/0153489 A1 | 6/2015 | Gallas et al. | |
| 2015/0161472 A1* | 6/2015 | Yoshioka | G06K 9/0061 382/197 |

(Continued)

FOREIGN PATENT DOCUMENTS

WO 2014/169148 10/2014

*Primary Examiner* — Tri T Ton
(74) *Attorney, Agent, or Firm* — Browdy and Neimark, PLLC

(57) ABSTRACT

A computer implemented method for self-administrated testing of eyeglasses, the method comprising computer performed steps, the steps comprising: analyzing at least one image of a predefined pattern reflected from at least one lens of a pair of eyeglasses of a user, and identifying a property of the lens based on the analyzing.

22 Claims, 12 Drawing Sheets

(56) References Cited

U.S. PATENT DOCUMENTS

2016/0034032 A1* 2/2016 Jeong .................... G06T 19/006
                                                         345/156
2017/0116736 A1* 4/2017 Yoshioka ............... A61B 5/163
2019/0072455 A1* 3/2019 Limon ............... G01M 11/0207

* cited by examiner

SELF-ADMINISTRATED TESTING OF EYEGLASSES

FIELD AND BACKGROUND OF THE INVENTION

The present invention relates to testing eyeglasses and, more particularly, but not exclusively to an apparatus and method for self-administrated testing of eyeglasses.

In recent years, visual health and protection from harmful light accounts for a growing share of the research and innovation efforts by manufacturers of lenses for use in eyewear.

Indeed, today, lenses may be manufactured with an enormous variety of properties such as filters or protective layers for protection against UV (Ultraviolet) light, HEV (High-Energy Visible) light, other features, etc.

However, the tools currently available for detecting the presence of properties such as filters or layers on lenses are limited to professional equipment which is usually adapted for use in an industrial setting (say by a QA Engineer or an optical technician), and is not readily available for most eyeglasses wearers.

Further, the professional equipment often requires complex operation by a professional worker, particularly in as far as analyzing measurements taken using such tools is concerned.

Consequently, with the growing variety of filters and layers that may be applied to lenses in use on eyewear like sunglasses or other eyeglasses, a person who purchases eyeglasses has to rely on information received from a seller or manufacturer (if available).

The person has no way to independently find out or verify the presence of features such as specific filers or protective layers on the lenses installed on the eyeglasses purchased by the person.

SUMMARY OF THE INVENTION

According to one aspect of the present invention there is provided a computer implemented method for self-administrated testing of eyeglasses, the method comprising computer performed steps, the steps comprising: analyzing at least one image of a predefined pattern reflected from at least one lens of a pair of eyeglasses of a user, and identifying a property of the lens based on the analyzing.

According to a second aspect of the present invention there is provided an apparatus for self-administrated testing of eyeglasses, the apparatus comprising: a computer, an image analyzer, implemented on the computer, configured to analyze at least one image of a predefined pattern reflected from at least one lens of a pair of eyeglasses of a user, and a property identifier, in communication with the image analyzer, configured to identify a property of the lens based on the analyzed image.

According to a third aspect of the present invention there is provided a non-transitory computer readable medium storing computer executable instructions for performing steps of self-administrated testing of eyeglasses, the steps comprising: analyzing at least one image of a predefined pattern reflected from at least one lens of a pair of eyeglasses of a user, and identifying a property of the lens based on the analyzing.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference made to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1A:
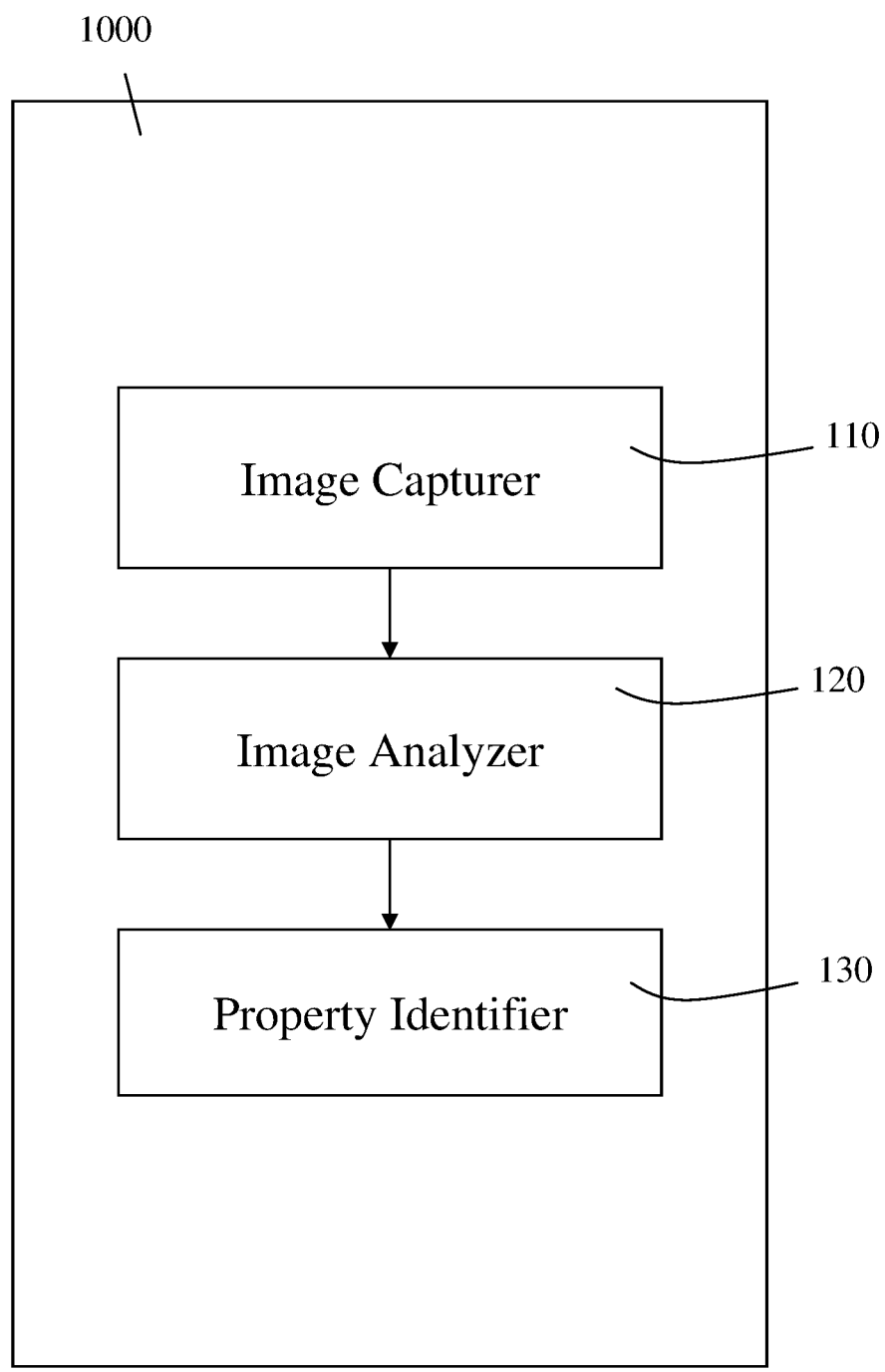
FIG. 1A is a block diagram schematically illustrating a first exemplary apparatus for self-administrated testing of eyeglasses, according to an exemplary embodiment of the present invention.

The present embodiments comprise a method and an apparatus for self-administrated testing of eyeglasses.

Modern lenses in use in modern eyeglasses have a variety of properties which may be selected to best fit the different needs of an individual user of eyeglasses, say different filters or protective layers—for protection against UV (Ultraviolet) light or HEV (High-Energy Visible) light, or other features, as known in the art.

However, the tools currently available for detecting the presence of features such as filters or layers on lenses are limited to professional tools for use (say by optical technicians) in an industrial environment, and are not available for most users of eyeglasses.

Consequently, with a growing variety of filters and layers that may be applied to lenses in use on eyewear such as sunglasses or other eyeglasses, a person who purchases eyeglasses has to rely on information received from a seller or manufacturer, and has no way to verify the information.

According an exemplary embodiment of the present invention, there is provided a method of self-administrated testing of eyeglasses by the user of the eyeglasses.

Optionally, the method is implemented on the user's mobile phone (say an Apple iPhone® or a Samsung Galaxy® Smart Phone), Tablet Computer, etc.—i.e. using devices available to any user nowdays, as described in further detail hereinbelow.

Consequently, the user may be able to test his eyeglasses without professional tools of the sort currently used in industrial environments or the help of a technician or engineer, say at the user's home or office.

The method may help the user figure out, for example, if the lenses in the user's eyeglasses have a HEV (High-Energy Visible) light protective layer, an AR (Anti-reflex) coating, etc., or another property, as described in further detail hereinbelow.

Thus, in one example, according to an exemplary embodiment, an application that runs on the user's mobile phone (say an Apple iPhone®) presents a predefined pattern on the mobile phone's screen, say a radial pattern made of several slices arranged around the pattern's center, as described in further detail hereinbelow.

Then, the user holds his mobile phone against his eyeglasses, and thereby lets the predefined pattern project from the mobile phone's screen and reflect from at least one of the lenses installed on the user's eyeglasses, say when the user wears the eyeglasses.

Next, one or more images of the predefined pattern as reflected from the lens is captured, say using the smart phone's camera. The image may be captured when the user pushes a certain button on his smart phone, as if capturing a "Selfie" image of his own face, or rather automatically upon alignment of the camera and lens in a predefined way with respect to each other, as described in further detail hereinbelow.

Consequently, the captured one or more images are analyzed, and based on the analysis of the one or more images, there may be identified a property of the lens, say the presence of filters or layers for protection against UV (Ultraviolet) light, HEV (High-Energy Visible) light, etc., in the lenses installed on the user's eyeglasses.

The principles and operation of an apparatus, a method, and a computer readable memory, according to the present invention, may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1A, which is a block diagram schematically illustrating a first exemplary apparatus for self-administrated testing of eyeglasses, according to an exemplary embodiment of the present invention.

A first apparatus 1000 for self-administrated testing of eyeglasses, according to an exemplary embodiment of the present invention is implemented on a computer.

Optionally, the computer may be a user's computer such as a mobile phone, a tablet computer, or another computer in use by a user, a computer in remote communication with the user's computer, or both the user's computer and the remote computer, as described in further detail hereinbelow.

Thus, optionally, all parts of the apparatus 1000 are implemented on the user's computer, say on the mobile phone, tablet computer, laptop computer, or other computer in use by the user, as described in further detail hereinbelow.

Optionally, one or more of the apparatus 1000 parts (say one or more of the parts 110-130 shown in FIG. 1A) may be implemented at least in part, on a remote computer in communication with the user's computer, as described in further detail hereinbelow.

The apparatus 1000 includes at least one computer processor, say one or more computer processor of the user's computer (say the user's smart mobile phone), one or more computer processor of the remote server, or both.

The apparatus 1000 further includes one or more additional parts described in further detail hereinbelow, such as the parts denoted 110-130 in FIG. 1A.

The additional parts may be implemented as software— say by programming the one or more computer processors to execute the method described in further detail hereinbelow and illustrated using FIG. 2A, as hardware—say as an electric circuit that implements at least a part the method, etc., or any combination thereof.

In one example, one or more parts of the apparatus 1000 is implemented as a computer application such an iPhone® App, which may be downloaded to the user's smart cellular phone (say an Apple® iPhone) or tablet computer (say an Apple® iPad), as described in further detail hereinbelow.

Thus, the exemplary first apparatus 1000 includes an image capturer 110.

The image capturer 110 captures one or more stills or video images of a predefined pattern. The pattern may be defined in advance—say by a programmer or an operator of apparatus 1000.

Optionally, the image capturer 110 captures the one or more images using an image capture device (say a mobile phone's camera) in use by the user, as described in further detail hereinbelow and as illustrated using FIG. 2A.

The image capturer 110 may be implemented, for example, on the user's computer, on a remote computer in communication with the user's computer or with the image capture device, or on both computers, as described in further detail hereinabove.

Optionally, the image capture device is a camera installed on a mobile phone in use by the user, and the image capturer 110 controls the camera, say by using the camera to capture images (say a video stream or several stills images), by forwarding one of the images for analysis, etc., as described in further detail hereinbelow.

In other examples, the image capture device may be a camera installed on a tablet computer, on a laptop computer, or on another computer in use by the user, similarly controlled by the image capturer 110, as described in further detail hereinbelow.

The image capturer 110 captures the one or more images simultaneously to reflection of the predefined pattern from one or both lens of a pair of eyeglasses, say as the user holds his mobile phone against the user's eyeglasses during presentation of the pattern on the phone's screen, such that the pattern is projected onto the lens.

The apparatus 1000 further includes an image analyzer 120 in communication with the image capturer 110.

The image analyzer 120 analyzes the one or more images captured by the image capturer 120, as described in further detail hereinbelow, and as illustrated using FIG. 2A.

Optionally, the image is a digital color image based on the RGB color model, as known in the art, and the image analyzer 120 analyzes the one or more images by comparing RGB color channel intensity values measured over the reflected, predefined pattern as captured in the image, as described in further detail hereinbelow.

In one example, the image analyzer 120 compares between one or more same color channel intensity values (say a mean or a sum intensity value calculated over all pixels of each respective one of one or more of the channels) of different parts of the reflected pattern as captured in the image, as described in further detail hereinbelow.

For example one comparison may be made between blue channel intensity values of two of the parts and another comparison may be made between red channel intensity values of two of the parts.

The comparison is thus used to assess a per-channel (i.e. per primary color) difference among the parts.

In a second example, the image analyzer 120 compares between absolute differences or ratios, calculated between different color channel intensity values (say a mean or sum intensity value calculated over all pixels of each respective one of one or more of the channels) for different parts of the reflected pattern as captured in the image.

The comparison is thus used to assess the difference among the parts with respect to the ratio or absolute difference between different primary colors.

In a third example, the image analyzer 120 compares between one or more color channel intensity values (say a mean or a sum intensity value calculated over all pixels of each respective one of one or more of the channels) and a reference value predefined per each respective one of one or more of the channels.

The one or more color channel intensity values may be calculated for the whole reflected pattern as captured in the image, or rather per each one of one or more different parts of the reflected pattern as captured in the image. Similarly and respectively, the one or more reference values may be defined for the whole pattern or rather per each one of the one or more parts of the predefined pattern.

The comparison is thus used to assess a per-channel (i.e. per primary color) deviation from the predefined reference values.

In a fourth example, the image analyzer 120 calculates one or more color channel intensity values (say a mean or a sum intensity value calculated over all pixels of each respective one of one or more of the channels). Again, the one or more color channel intensity values may be calculated for the whole reflected pattern as captured in the image, or rather per each one of one or more different parts of the reflected pattern as captured in the image.

In the fourth example, the image analyzer 120 further calculates absolute differences or ratios between the color channel intensity values. Then, the image analyzer 120 compares the differences or ratios to reference values predefined for the whole predefined pattern or rather per each one of the one or more parts of the predefined pattern.

The comparison is thus used to assess the deviation of the whole reflected pattern or rather of one or more specific parts of the reflected pattern from a predefined ratio or absolute difference between primary colors.

Optionally, the apparatus 1000 further includes a reference value calculator (not shown) in communication with the image analyzer 120.

Optionally, the reference value calculator carries out a preliminary step in which the reference value calculator calculates one or more reference values per each specific one of the predefined pattern's parts based on the specific part's coloring in the predefined pattern, as described in further detail hereinbelow.

The calculation may be based, for example, on an averaging or summing over intensity values expected for that part upon presentation on a screen of a specific model, in light of the screen's technical characteristics and the color selected for that part.

Optionally, the color is selected for the part based on the screen's technical characteristics—say by an operator or programmer of apparatus 1000, as described in further detail hereinbelow.

Additionally or alternatively, in the preliminary step, the reference value calculator allows one or more of the reference values to be defined by an operator or programmer of the apparatus 1000.

The apparatus 1000 further includes a property identifier 130 in communication with the image analyzer 120.

The property identifier 130 identifies a property of the lens installed on the eyeglasses based on the image analyzed using the color channel intensity values, say using one or more of the comparisons illustrated using the examples provided hereinabove, and as described in further detail hereinbelow.

Additionally or alternatively, the analyzing by the image analyzer 120 further includes using the RGB color channel intensity values measured over the whole area of the pattern as captured in the image, or rather over specific parts of the pattern as captured in the image, to calculate a reflection spectrum (say a spectral graph), as described in further detail hereinbelow.

Consequently, the image analyzer 120 compares the calculated spectrum to a reference spectrum expected for the whole pattern or for the specific parts, for identifying a property of the lens.

For example, the image analyzer 120 may calculate the reference spectrum for the whole pattern or rather per each specific one of the parts, based on coloring in the predefined pattern and on characteristics of a screen in use for projecting the pattern, as described in further detail hereinbelow.

Optionally, the image analyzer 120 may further identify a predefined deformation along a virtual segment within the reflected pattern, say along a linear virtual segment which extends between two points inside a blank part of the predefined pattern. The two points may be selected arbitrarily or rather so as to examine a specific region of interest (ROI), say a specific area in the middle of the reflected pattern, a specific area around the center of the lens, etc., as described in further detail hereinbelow.

The deformation may include, but is not limit to: an unexpected discontinuity of the virtual segment, a change in curvature of the virtual segment (say an unexpected sinusoidal form when expected to be straight), etc., as described in further detail hereinbelow.

Consequently, based on the deformation identified by the image analyzer 120, the property identifier 130 identifies a property of the lens, as described in further detail hereinbelow.

Optionally, the image analyzer 120 uses one or more functions based on one or more of the above described comparisons and identifying of deformations.

In one example, each one of the functions yields an indicator usable for identifying a different, respective property of the lens from which the predefined pattern is reflected.

Optionally, the property identified by the property identifier 130 is a one of having a predefined coating, a predefined filter, or of having both the coating and the filter, as described in further detail hereinbelow.

Optionally, the property identified by the property identifier 130 is a one of having a High Energy Visible (HEV) light protective coating, a HEV light protective filter, or both the HEV light protective coating and the HEV light protective filter.

Optionally, the property identifier 130 identifies the lens property of having the HEV protective coating, HEV protective filter, or both, based on a significantly higher mean of pixel intensity values in the RGB Blue channel or in both the Blue and Green RGB channels, when compared to a mean of pixel intensity values in the Red Channel.

Optionally, the image analyzer 120 calculates the means over all pixels in an area of the image occupied by the reflected predefined pattern, or rather specifically per each one of one or more parts of the area occupied by the reflected pattern, over all pixels in that part, as described in further detail hereinbelow.

Thus, in one example, the predefined pattern is white and blank, and the image analyzer 120 calculates the mean intensity values for the whole area occupied by the reflected pattern, in the RGB Red, Green, and Blue channels. In the example, the image analyzer 120 calculates the mean for each one of the three channels, and rounds the mean to the nearest integer.

In the example, when the ratio of the rounded mean intensity values of the Green and Blue channels is 1:1 and the ratio of the rounded mean intensity value of the Red channel to either the rounded Green channel or the rounded Blue channel mean intensity value is below 0.75, the property identifier 130 identifies the property of having a HEV coating, HEV filter, or both.

Optionally, the property identified by the property identifier 130 is a one of having an Anti-Reflection (AR) coating, an AR filter, or both the AR coating and the AR filter.

Optionally, the image identifier 130 identifies the lens property of having the AR coating, the AR filter, or both, based on a reduction of over 20% in the mean intensity value of each one of the RGB channels when compared to predefined reference values, as described in further detail hereinbelow.

The image analyzer 120 may calculate the mean intensity values per the whole area of the captured image occupied by the reflected predefined pattern, or specifically per each one of one or more parts of the area occupied by the reflected pattern, as described in further detail hereinbelow.

Thus, in one example, the predefined pattern is white and blank, and each one of the mean intensity values is calculated by the image analyzer 120, for the RGB Red, Green, and Blue channels is rounded by the image analyzer 120, to the nearest integer.

In the example, when the calculated mean intensity values for the Red, Green, and Blue channels are below 80% of the predefined reference values, or below 80% of the maximum intensity possible with the image capture device in use, the property identifier 130 identifies the property of having the AR coating, AR filter, or both.

Optionally, the image analyzer 120 may further identify a predefined deformation along a virtual segment within the reflected pattern, say along a linear segment which extends between two points inside a blank part of the reflected pattern, as described in further detail hereinabove.

Based on the identified deformation of the virtual segment, the property identifier 130 may identify one or more properties of the lens (say of having a scratch or a topographical irregularity), as described in further detail hereinbelow.

Optionally, the apparatus 1000 further includes a pattern projector (not shown).

The pattern projector may project the predefined pattern from a light source (say a one in use by the user) onto the lens, say from a slide projector, a computer screen, a screen of a mobile phone (say an Apple iPhone® smart phone), a flashlight, an indoor or other light (say through a slide which bears the pattern), etc.

The pattern projector may be implemented, for example, on the user's computer, on a remote computer in communication with the user's computer or with the light source, or on both computers, as described in further detail hereinabove.

Thus, in one example, in a preliminary step, the image projector projects the predefined pattern, by presenting the predefined pattern on a screen of a mobile phone in use by the user.

Optionally, in the example, the user holds the mobile phone against a pair of eyeglasses worn by the user, with the mobile phone's screen facing the user's face, simultaneously to presentation of the pattern on the mobile phone's screen.

Consequently, the pattern is projected onto the lens from which the pattern reflects back, and in turn, the image capturer 110 captures an image of the predefined pattern reflected from the lens, say using the user's mobile phone camera, as described in further detail hereinbelow.

Alternatively, in the first example, rather than wearing the eyeglasses, the user places the eyeglasses opposite the mobile phone, say on a table, and simultaneously to presentation of the pattern on the mobile phone's screen, the image capturer 110 captures an image of the predefined pattern reflected from the lens, using the mobile phone camera.

Optionally, the predefined pattern is projected with a marking usable by the user for aligning the lens in a predefined orientation prior to capturing of the image of the pattern reflected from the lens, as described in further detail hereinbelow, and as illustrated, for example, in FIG. 5 and FIG. 6.

Optionally, the apparatus 1000 further includes a color selector.

The color selector carries out a preliminary color selection step prior to projection of the predefined pattern (say prior to the presentation of the predefined pattern on the screen).

In the color selection step, the color selection for one or more parts of the predefined pattern is optimized according to technical characteristics of the image capture device—say a digital camera, of a device used for projecting the pattern onto the lens—say a digital screen, or of both devices.

Figure 3:
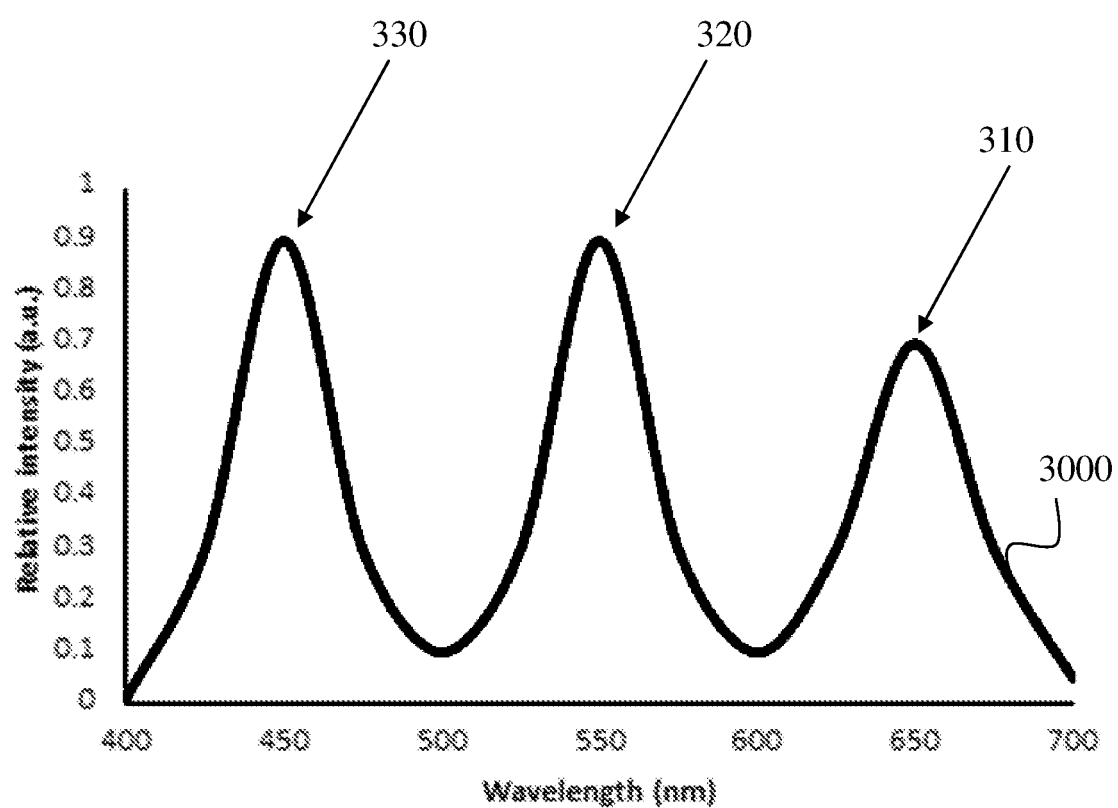
FIG. 3 is a simplified diagram schematically illustrating an exemplary graph depicting an emission spectrum of one exemplary digital screen.
Figure 4:
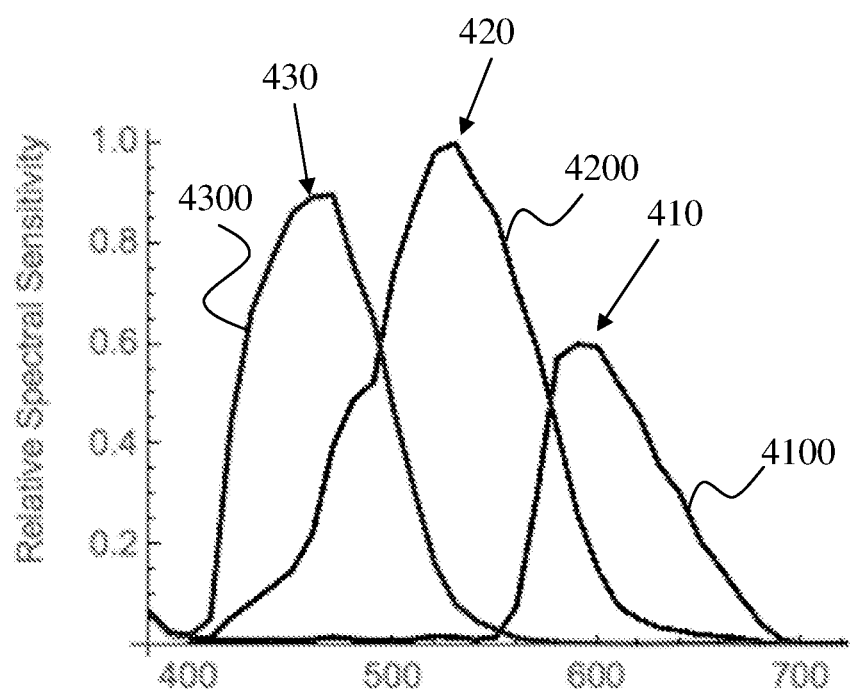
FIG. 4 is a simplified diagram schematically illustrating an exemplary set of three graphs, depicting sensitivity of a digital camera for three primary colors.

For example, the color selection may be optimized according to intensity of color emission by the screen per different colors, according to sensitivity of the camera to light in different primary colors, etc., as described in further detail hereinbelow and as illustrated for example, using FIGS. 3-5.

The predefined pattern may be designed in various ways.

For example, the predefined pattern may be colored, non-colored (say grayscale), or rather a one that has one or more colored parts and one or more non-colored (say grayscale) parts.

Optionally, the predefined pattern may be blank, non-blank (say a one with graphical or textual content), or rather a one that has one or more blank parts and one or more non-blank parts.

Optionally, the predefined pattern includes two or more parts of different color, color level (say grey level) or texture, and each part has a respective, predefined color, color level or texture, and a respective, predefined position within the pattern.

Consequently, the image analyzer 120 may analyze the captured image based on the color, color level or texture of at least one of the parts, and on the part's position within the pattern, say using one or more of the above described comparisons, as described in further detail hereinbelow.

Optionally, the predefined pattern includes one or more predefined markings.

Figure 5:
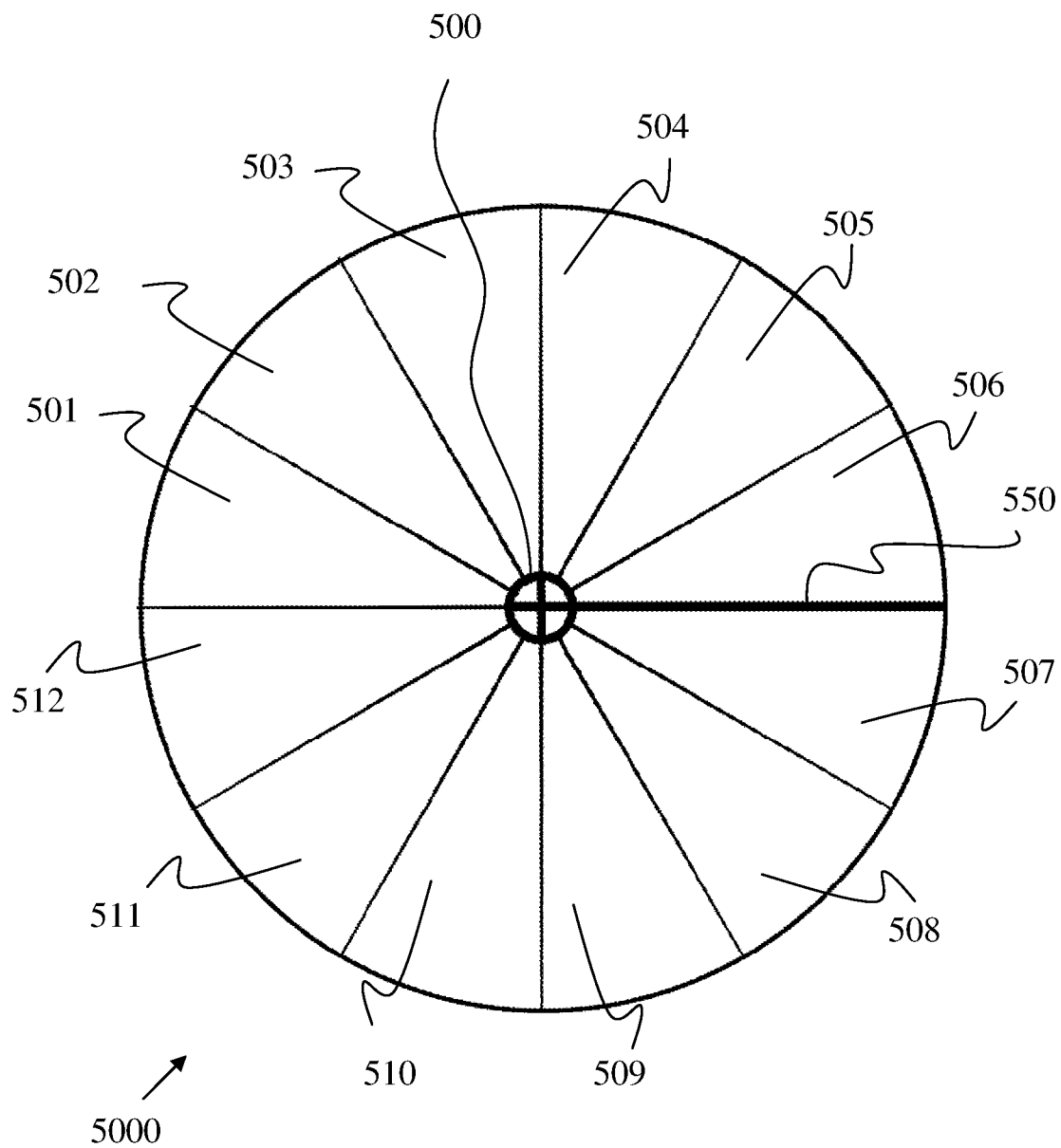
FIG. 5 is a simplified diagram schematically illustrating an exemplary radial predefined pattern, according to an exemplary embodiment of the present invention.
Figure 6:
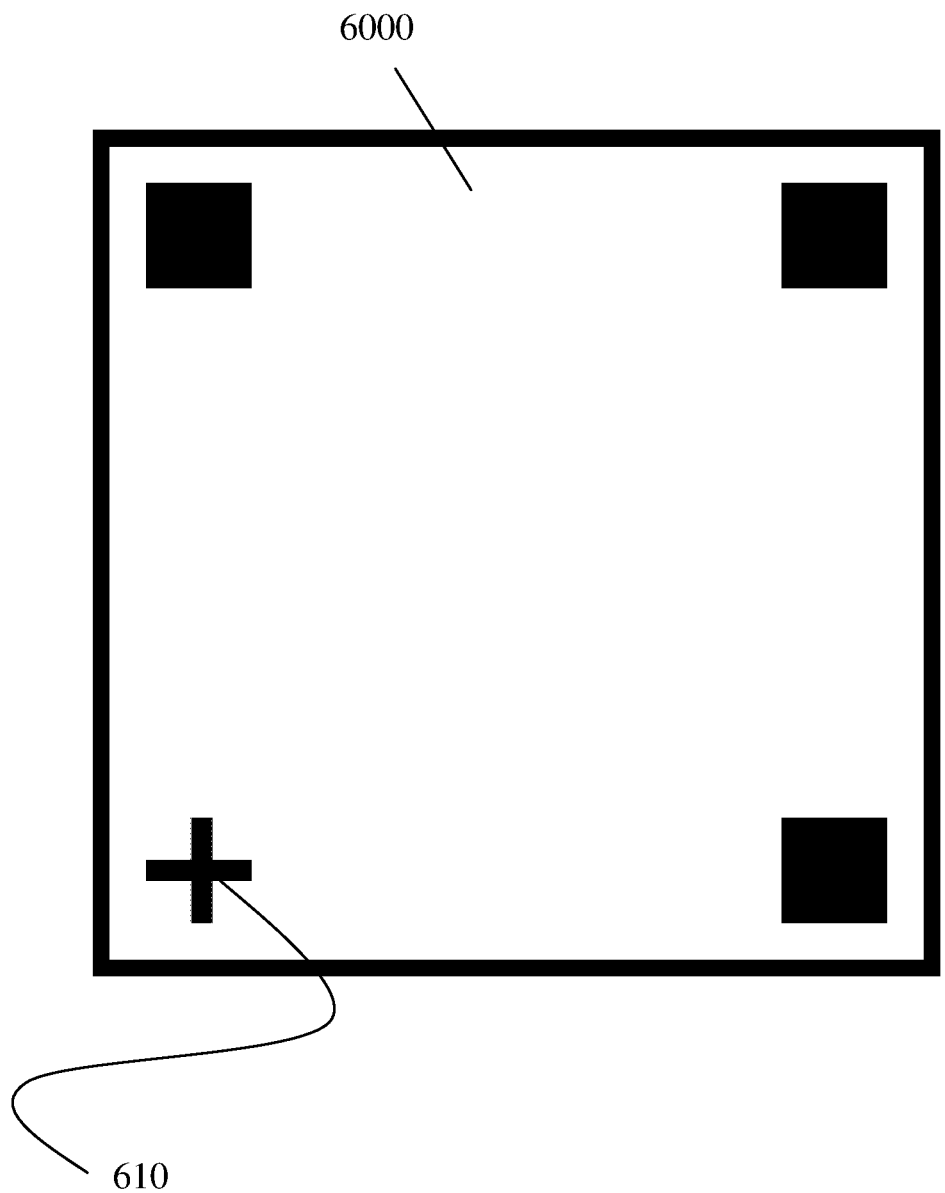
FIG. 6 is a simplified diagram schematically illustrating a first exemplary planner predefined pattern, according to an exemplary embodiment of the present invention.

In one example, a marking 550 extends rightward from the center of a radial pattern 5000, as illustrated, for example in FIG. 5.

In other cases, the markings, may include, for example a number, an arrow, a cross, a line, words, letters, etc., as described in further detail hereinbelow, and as illustrated, for example in FIG. 6.

Optionally, one or more of the markings may be used by the user in aligning a device used to project the pattern with respect to the lens, such that the projected, predefined pattern aligns on the lens in a predefined way, as described in further detail hereinbelow.

Optionally, the apparatus 1000 further includes an orientation determiner (not shown).

The orientation determiner automatically identifies and locates the marking in the captured image, and once identified and located, uses the markings to identify an orientation of the reflected pattern, the pattern's center, etc., as described in further detail hereinbelow.

Optionally, the identified orientation, center, or both, is used by the image analyzer 120 for analyzing the captured image, as described in further detail hereinbelow.

Optionally, upon identified alignment of the pattern in a predefined position, the image capturer 110 automatically forwards the captured image to the image analyzer 120, thereby initiating the analyzing of the captured image by the image analyzer 120, as described in further detail hereinbelow.

Optionally, only upon identified alignment in the predefined orientation, does the image capturer 110 forwards the captured image to the image analyzer 120, thereby initiating the analyzing.

Figure 7:
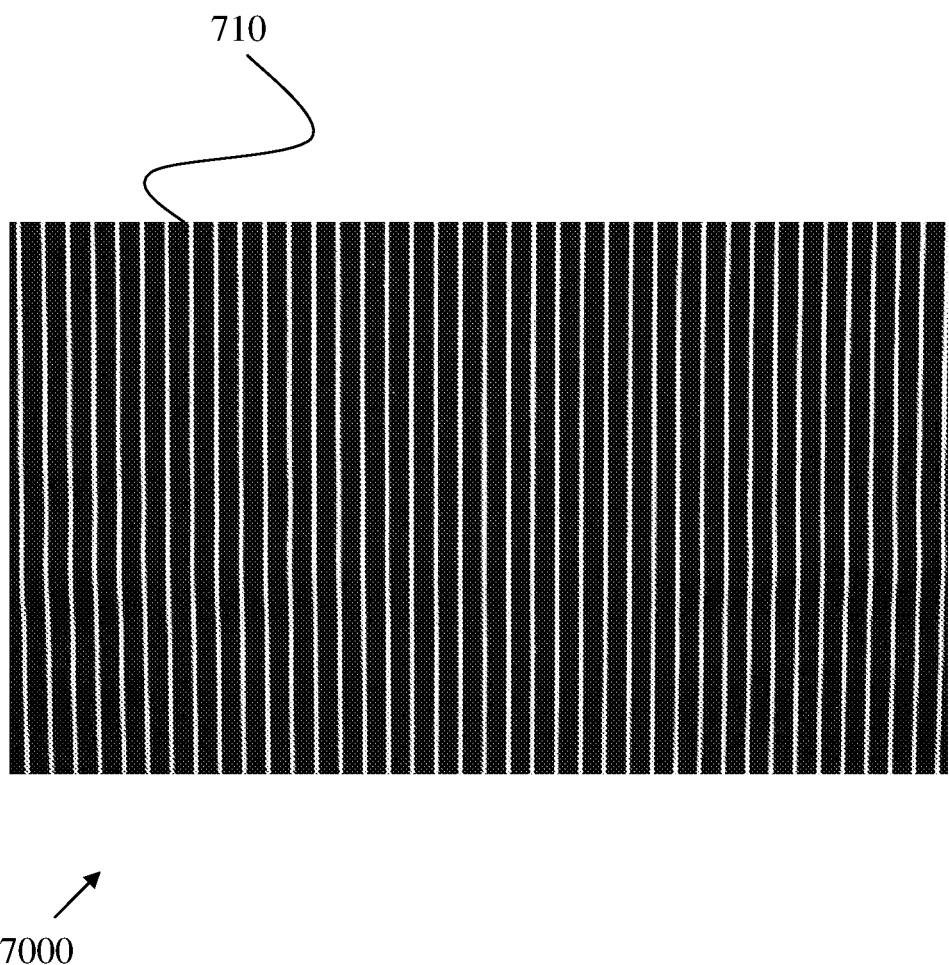
FIG. 7 is a simplified diagram schematically illustrating a second exemplary planner predefined pattern, according to an exemplary embodiment of the present invention.

Optionally, the orientation determiner identifies the orientation of the reflected pattern rather based on a directional aspect of a general texture of the predefined pattern, as described in further detail hereinbelow, and as illustrated for example, in FIG. 7.

Additionally or alternatively, the orientation determiner further uses a GUI, for allowing the user to manually identify the center of the reflected pattern, the orientation of the reflected pattern, or both, say by manually marking the center or orientation, as described in further detail hereinbelow.

Thus, in one example, the GUI used by the orientation determiner is implemented using a screen of the user's mobile device or other computer, on which screen, real time video images of the reflected pattern as captured using the image capture device of the mobile phone or tablet computer, are presented.

In the example, simultaneously to presentation of the video images, the user is allowed to mark the center by touching the screen, mark an orientation of the pattern using a multi-touch gesture in which the user moves two fingers in a predefined way while touching the screen, etc., as known in the art of multi-touch gesture recognition.

Optionally, the apparatus 1000 further includes a user guidance manager.

The user guidance manager guides the user through one or more steps leading to the identifying of one or more properties of the lens.

Optionally, the identified orientation, center, or both, is used by the user guidance manager for guiding the user in aligning the eyeglasses and image capture device (say by moving his mobile phone) in a specific way, etc., as described in further detail hereinbelow.

Thus, in one example, the user guidance manager guides the user to move the mobile phone over the lens, with the phone's camera facing the eyeglasses, to the right, to the left, etc., until the predefined pattern as projected onto one the eyeglasses' lens aligns in a predefined position, as described in further detail hereinbelow.

The user may be guided for example, using vocal instructions given on the mobile phone's speaker, using a GUI implemented using titles with instructions, arrows, etc. or other cues that appear on the video images captured and presented on the phone's screen as the user moves the mobile phone over the eyeglasses, etc.

Optionally, the orientation determiner further locates one or more boundaries of the lenses, say using Canny Edge Detection, an analysis of Oriented Gabor Filter Responses, etc., or any combination thereof, as described in further detail hereinbelow.

Optionally, the user guidance manager uses the located one or more boundaries for guiding the user in aligning the image capture device (say the phone's camera) and the eyeglasses in a preferred position with respect to each other, such that the pattern is projected on a preferable area of one the lenses, as described in further detail hereinbelow.

Optionally, the orientation determiner further estimates location of the lens center, as described in further detail hereinbelow.

The estimating may be based, for example, on a mass center of the lens as calculated based on the location of the one or more boundaries, on intersection of a virtual vertical line positioned where the height of the lens is maximal with a virtual horizontal line positioned where the width of the lens is maximal, etc., or any combination thereof. The horizontality and verticality of the lines may be selected, for example, so as to be parallel to the horizontal side and vertical side of a smallest rectangle that would bound the located boundaries of lens, as known in the art.

Optionally, the location of the lens center may be used by the image analyzer 120, for analyzing the image, say for looking for certain topographical changes expected on the lens center.

Optionally, the user guidance manager uses the estimated location of the lens center for guiding the user in aligning the image capture device and the eyeglasses in a preferred position with respect to each other, such that the pattern is projected onto a preferable area of one of the lenses, as described in further detail hereinbelow.

Optionally, the orientation determiner further locates a center of the reflected pattern, say the round blank area in the center of the pattern illustrated using FIG. 5, say using known in the art image recognition techniques, as described in further detail hereinbelow.

Optionally, the location of the pattern's center may be used by the image analyzer 120, for analyzing the image, say for finding a certain feature of a known position with respect to the pattern's center.

Optionally, the user guidance manager uses the located center of the predefined pattern for guiding the user in aligning the image capture device and the eyeglasses in a preferred position with respect to each other, as described in further detail hereinbelow.

Thus, in one example, the user guidance manager uses a GUI implemented using live video images captured by the user's mobile phone video camera as the user moves the mobile phone over the eyeglasses. The GUI presents the captured video images to the user in real time, as the user moves the mobile phone over the eyeglasses.

In the GUI, when the orientation determiner determines that the located reflected pattern center and the estimated lens center location in the images, are close enough, say within a predefined distance from each other (say a distance of less than 1% of the width of each one of the video images), the lens edges are colored green. However, when the orientation determiner determines that the located center of the reflected pattern and the estimated location of the lens are not close enough, the lens edges are colored red.

Further in the example, when the edges are colored green, the image capturer 110 forwards the last image captured using the phone's video camera for the image analyzer 120, thus initiating the analysis.

However, when the edges are colored red, the user guidance manager presents an arrow in the GUI, thereby guiding the user to move the phone or eyeglasses in a direction necessary for aligning the phone's video camera and the eyeglasses in a preferred position with respect to each other.

Optionally, the apparatus further includes a face feature identifier.

The face feature identifier identifies one or more features of the user's face in one or more of the captured images, say using known in the art face detection methods applied on the captured images (say the video images), as described in further detail hereinbelow.

Optionally, the face feature identifier further locates the eyeglasses or lenses on the captured images, say using known in the art segmentation methods and\or tracking methods, as described in further detail hereinbelow.

Figure 1B:
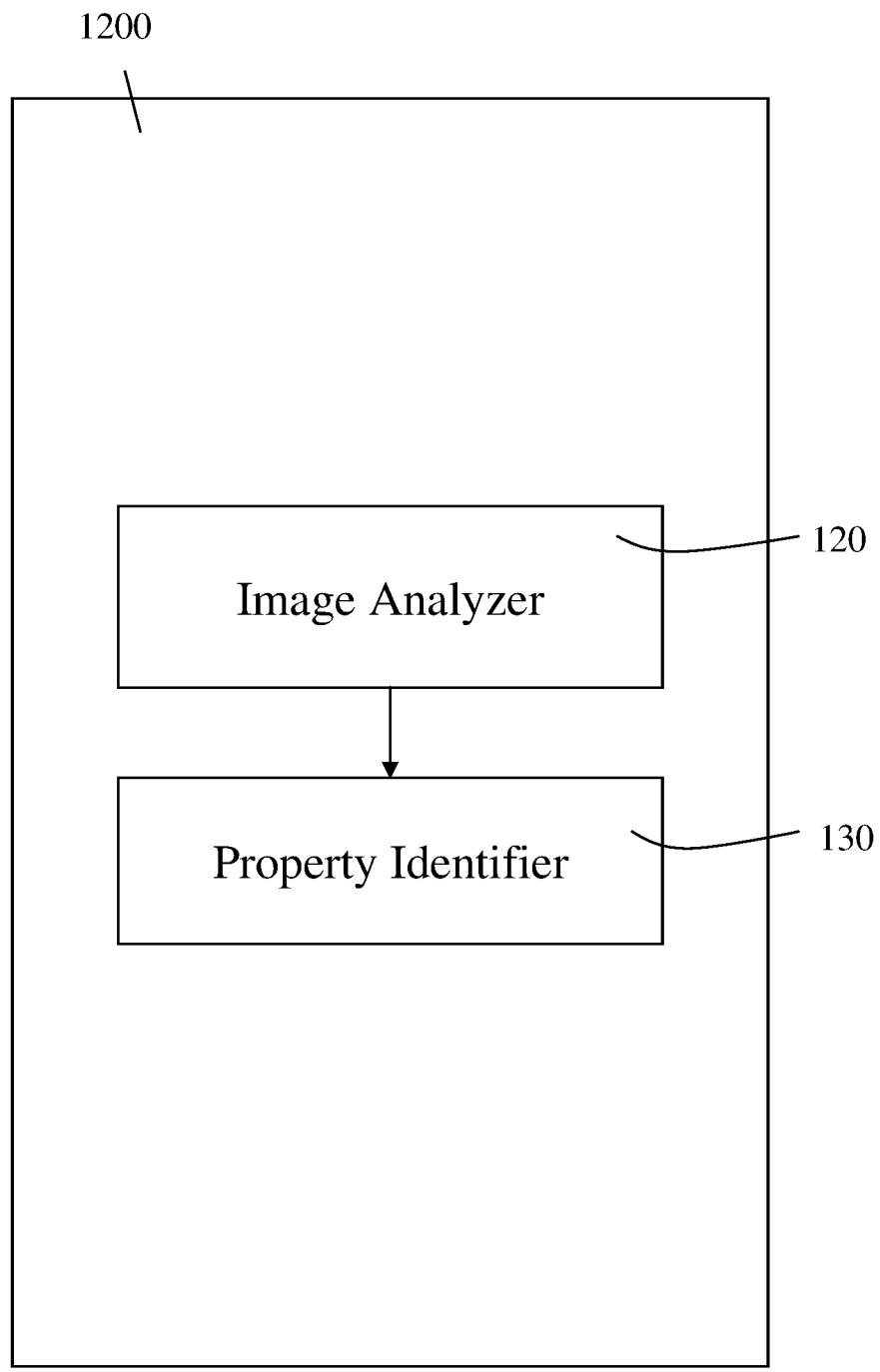
FIG. 1B is a block diagram schematically illustrating a second exemplary apparatus for self-administrated testing of eyeglasses, according to an exemplary embodiment of the present invention.

Reference is now made to FIG. 1B, which is a block diagram schematically illustrating a second exemplary apparatus for self-administrated testing of eyeglasses, according to an exemplary embodiment of the present invention.

A second apparatus 1200 for self-administrated testing of eyeglasses, according to an exemplary embodiment of the present invention, is implemented on a computer (say on one or more computers in communication with each other).

Optionally, the apparatus 1200 is implemented on a computer (say a server computer) in remote communication with a tablet computer, mobile phone, or other computer in use for capturing one or more images of a predefined pattern reflected from a lens of a user's eyeglasses, as described in further detail hereinabove.

Thus, optionally, all parts of the apparatus 1200 are implemented on the remote computer, as described in further detail hereinbelow.

Optionally, one or more of the apparatus 1200 parts may be implemented at least in part, on the user's computer (say mobile phone), on another computer in communication with the server computer, etc., as described in further detail hereinbelow.

The apparatus 1200 includes at least one computer processor, say one or more computer processor of the server computer, one or more computer processor of the user's computer (say the user's smart mobile phone, tablet computer, etc.), or both.

The apparatus 1200 further includes one or more additional parts described in further detail hereinbelow, such as the parts denoted 120-130 in FIG. 1B, the image receiver, additional parts, etc., as described in further detail hereinbelow.

Each one of the parts denoted 120-130 in FIG. 1B, the image receiver, and the additional parts, may be implemented as software—say by programming the one or more computer processors to execute steps of the methods described in further detail hereinbelow, as hardware—say as an electric circuit that implements at least a part the methods, etc., or any combination thereof.

Thus, the second exemplary apparatus 1200 includes the image analyzer 120 and property identifier 130, as described in further detail for the first apparatus 1000 hereinabove.

Optionally, the exemplary second apparatus 1200 further includes an image receiver (not shown).

The image receiver receives one or images of a predefined pattern reflected from at least one lens of a pair of eyeglasses of a user, say from a computer (say the user's mobile phone or a tablet computer, used to capture the one or more images of the pattern as reflected from a lens of the user's pair of eyeglasses).

The image receiver may receive the one or more images, for example, over the internet, an intranet network, a LAN (Local Area Network), a wireless network, another communication network or channel, or any combination thereof, as known in the art.

Optionally, the second apparatus 1200 further includes one or more additional parts as described in further detail for the first apparatus 1000 hereinabove.

For example, the second apparatus 1200 may include the image capturer 110, face feature identifier, user guidance manager, orientation determiner, etc., or any combination thereof, each of which may be implemented on the remote computer, user's computer, other computer, or any combination thereof, as described in further detail hereinabove.

Figure 2A:
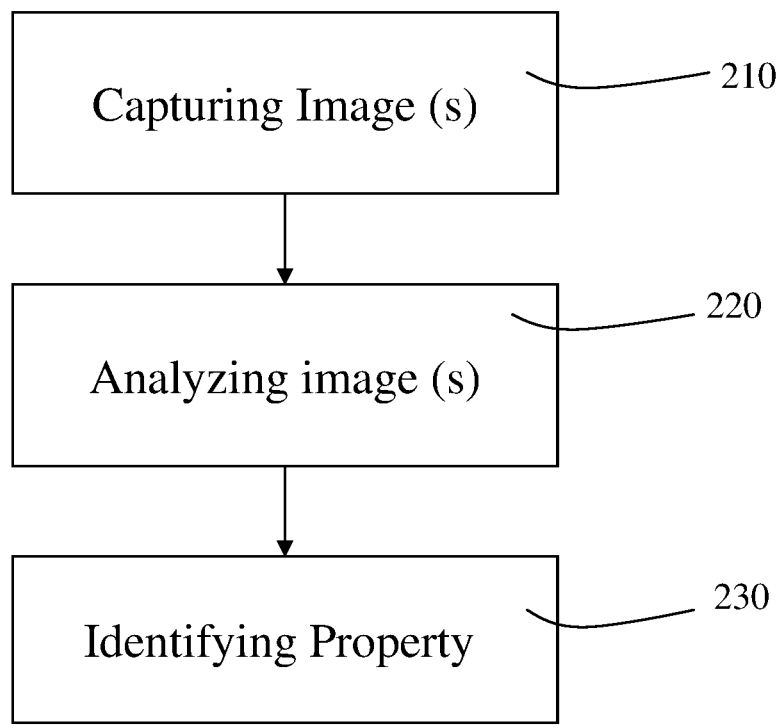
FIG. 2A is a flowchart illustrating a first exemplary computer implemented method for self-administrated testing of eyeglasses, according to an exemplary embodiment of the present invention.

Reference is now made to FIG. 2A, which is a flowchart illustrating a first exemplary computer implemented method for self-administrated testing of eyeglasses, according to an exemplary embodiment of the present invention.

An exemplary method for self-administrated testing of eyeglasses, according to an exemplary embodiment of the present invention, may be executed on a computer such as a smart phone, a tablet computer or another computer, say a computer in use by a user who wears a pair of eyeglasses (say sunglasses or other eyeglasses), etc. or any combination thereof.

The exemplary method may be implemented by programming the computer, say by downloading a computer application from a remote server, by uploading computer executable instructions from a computer readable medium, etc., as known in the art.

Thus, the method may include steps that are executed by a computer application such an iPhone® or an Android™ App, which may be downloaded to a mobile phone (say an Apple® iPhone or a Samsung® Galaxy smart phone) or tablet computer (say an Apple® iPad). The computer application may use the mobile phone's camera and screen, for carrying out some of the steps of the exemplary method, as described in further detail hereinbelow.

In a first example, all method steps such as the steps of capturing 210, analyzing 220 and identifying 230, as described in further detail hereinbelow, are carried out on the computer, say on the user's mobile phone, tablet computer or laptop computer, by the computer application.

In a second example, the computer application rather communicates with a remote computer (say a remote server computer), for carrying out one or more parts of the method steps. Thus, in the second example, at least a part of the below described steps of analyzing 220 and identifying 230, is carried out on the remote computer (say the server computer).

Optionally, in the second example, the step of capturing 210 is also carried out on the remote server computer, say by remotely controlling an image capture device (say a mobile phone camera) in use (say by the user), for capturing 210 the one or more images.

Thus, in the exemplary method, there is captured 210 one or more stills or video images of a predefined pattern. The pattern may be defined in advance—say by a programmer or an operator of apparatus 1000.

Optionally, the one or more images are captured 210 using an image capture device (say the user's mobile phone camera), say by the image capturer 110 of apparatus 1000, as described in further detail hereinabove.

Optionally, the image capture device is a video camera installed on a mobile phone in use by the user, and the image capturer 110 controls the camera, say by using the camera to capture 210 images, by forwarding one of the images for analysis 220, etc., as described in further detail hereinbelow.

In other examples, the image capture device may be a camera installed on a tablet computer, on a laptop computer, or on another computer, as described in further detail hereinabove.

The one or more images are captured 210 simultaneously to reflection of the predefined pattern from one or both lenses of a pair of eyeglasses, say as the user holds his mobile phone against the user's eyeglasses during presentation of the pattern on the mobile phone's screen, such that the pattern is projected onto the lens of his eyeglasses.

Then, the captured 210 one or more images are analyzed 220, say by the image analyzer 120 of apparatus 1000, as described in further detail hereinabove.

Optionally, the image is a digital color image based on the RGB color model, as known in the art, and the analyzing 220 includes a comparison made between RGB color channel intensity values measured over the reflected, predefined pattern as captured 210 in the image, as described in further detail hereinbelow.

The digital color image is made of many pixels, and each one of the pixels is made of a combination of three primary colors (Red, Green and Blue).

A channel in this context is the equivalent of a grayscale image (or a part of such an image) of the same size as the digital color image (or the part), made of one of the primary colors (rather than of grey). Thus the channel may also be perceived as a monochromatic image in red, green or blue.

Each of the monochromatic images (i.e. channels) is made of a same number of pixels as the color image or part, which in the case of the monochromatic image, are pixels in a same primary color, which are sometimes referred to as subpixels. Similarly to a grayscale image pixel, each of the monochromatic image's pixels is characterized by an intensity specific to that pixel.

Thus, each RGB color image (or a part of such an image) may be characterized by a combination of three channels (Red, Green, and Blue).

In one example, the analyzing 220 includes a comparison made between one or more same color channel intensity values (say a mean or a sum intensity value calculated over all pixels of each respective one of one or more of the channels) of different parts of the reflected pattern as captured 210 in the image. For example one comparison may be made between blue channel intensity values of two of the parts and another comparison may be made between red channel intensity values of two of the parts, as described in further detail hereinabove.

The comparison is thus used to assess a per-channel (i.e. per primary color) difference among the parts.

In a second example, the analyzing 220 includes a comparison made between absolute differences or ratios, calculated between color channel intensity values (say a mean or a sum intensity value calculated over all pixels of each respective one of one or more of the channels) for different parts of the reflected pattern as captured 210 in the image.

The comparison is thus used to assess the difference among the parts with respect to the ratio or absolute difference between primary colors.

In a third example, the analyzing 220 includes a comparison made between one or more color channel intensity values (say a mean or a sum intensity value calculated over all pixels of each respective one of one or more of the channels) and a reference value predefined per each respective one of one or more of the channels.

The one or more color channel intensity values may be calculated for the whole reflected pattern as captured 210 in the image, or rather per each one of one or more different parts of the reflected pattern as captured 210 in the image, as described in further detail hereinabove.

Similarly and respectively, the one or more reference values may be defined for the whole pattern or rather per each one of one or more parts of the predefined pattern, as described in further detail hereinabove.

The comparison is thus used to assess a per-channel (i.e. per primary color) deviation from the predefined reference values.

In a fourth example, the analyzing 220 also includes calculating one or more color channel intensity values (say a mean or a sum intensity value calculated over all pixels of each respective one of one or more of the channels). Again, the one or more color channel intensity values may be calculated for the whole reflected pattern as captured 210 in the image, or rather per each one of one or more different parts of the reflected pattern as captured 210 in the image.

In the fourth example, there are further calculated absolute differences or ratios between the color channel intensity values of the whole reflected pattern or per each specific one of the parts. Then, the differences or ratios are compared to reference values predefined for the whole pattern or rather per each one of the one or more parts of the predefined pattern, as described in further detail hereinabove.

The comparison is thus used to assess the deviation of the whole reflected image or of one or more specific parts of the reflected pattern from a predefined ratio or absolute difference between primary colors.

Optionally, the method further includes a preliminary step in which the one or more reference values are calculated for the whole pattern, or rather per each specific one of the predefined pattern's parts based on the specific part's coloring in the predefined pattern, as described in further detail hereinbelow.

The calculation may be based, for example, on an averaging or summing over intensity values expected for that part upon presentation on a screen of a specific model, in light of the screen's technical characteristics and the color selected for that part. Optionally, the color is selected for the part based on the screen's technical characteristics—say by an operator or programmer of apparatus 1000, as described in further detail hereinbelow.

Additionally or alternatively, one or more of the reference values may rather be defined by an operator or programmer of apparatus 1000, as described in further detail hereinabove.

Based on the image analyzed 220 using the color channel intensity values, say using one or more of the comparisons illustrated using the examples provided hereinabove, there may be identified 230 a property of the lens, as described in further detail hereinbelow.

Optionally, the analyzing 220 further includes using the RGB color channel intensity values measured over the whole area of the pattern as captured 210 in the image, or rather over one or more specific parts of the pattern as captured 210 in the image, to calculate a reflection spectrum (say a spectral graph), as described in further detail hereinbelow.

For example, the RGB color channel intensity values may be used to calculate a VIS (Visual Light) Spectrum in the 400-700 NM wave length range, using color estimation methods, as known in the art.

Consequently, the spectrum calculated as a part of the analysis 220 of the captured 210 image may be compared to a reference spectrum expected for the whole pattern or for the specific part, for identifying 230 a property of the lens.

For example, the method may include a preliminary step of calculating the reference spectrum for the whole pattern or rather per each specific one of the parts, based on coloring in the predefined pattern, on characteristics of a screen in use for projecting the pattern, or of both, as described in further detail hereinbelow.

Optionally, the analyzing 220 further includes identifying a predefined deformation along a virtual segment within the reflected pattern, say along a linear virtual segment which extends between two points inside a blank part of the predefined pattern. The two points may be selected arbitrarily or rather so as to examine a specific region of interest (ROI), say a specific area in the middle of the reflected pattern.

The deformation may include, but is not limit to: an unexpected discontinuity of the virtual segment, a change in curvature of the virtual segment (say an unexpected sinusoidal form or a high frequency of amplitude changes, when expected to be straight), etc., as described in further detail hereinbelow.

Based on the deformation identified as a part of the analysis 220 of the image, there may be identified 230 a property of the lens, as described in further detail hereinbelow.

Optionally, the analyzing 220 includes using one or more functions based on one or more of the above described comparisons and identifying of deformations.

In one example, each one of the functions yields an indicator usable for identifying a different, respective property of the lens from which the predefined pattern is reflected.

Optionally, the identified 230 property is one of having a predefined coating, a predefined filter, or of having both the coating and the filter.

Optionally, the identified 230 property is one of having a High Energy Visible (HEV) light protective coating, a HEV light protective filter, or both the HEV light protective coating and the HEV light protective filter.

Optionally, the identifying 230 of the lens property of having the HEV protective coating, the HEV protective filter, or both, may be based on a significantly higher mean of pixel intensity values in the RGB Blue channel or in both the Blue and Green RGB channels, when compared to a mean of pixel intensity values in the Red Channel.

The means may be calculated over all pixels in the area of the captured 210 image occupied by the reflected predefined pattern, or specifically per each one of one or more parts of the area occupied by the reflected pattern, over all pixels in that part, as described in further detail hereinbelow.

Thus, in one example, the predefined pattern is white and blank, and mean intensity values are calculated for the whole area occupied by the reflected pattern, in the RGB Red, Green, and Blue channels. In the example, the mean calculated for each one of the three channels is rounded to the nearest integer.

In the example, when the ratio of the rounded mean intensity values of the Green and Blue channels is 1:1 and the ratio of the rounded mean intensity value of the Red channel to either the rounded Green channel or the rounded Blue channel mean intensity value is below 0.75, there is identified 230 the property of having an HEV coating, HEV filter, or both.

In a second example, the image capture device is an eight bit digital camera, as known in the art.

In the second example, when the mean intensity value calculated for the RGB Blue channel is higher than 200 and the mean intensity value calculated for the RGB Red channel is lower than 200, there is identified 230 the property of having a HEV coating, a HEV filter, or both.

Optionally, the identified 230 property is one of having an Anti-Reflection (AR) coating, an AR filter, or both the AR coating and the AR filter.

Optionally, the identifying 230 of the lens property of having the AR coating, the AR filter, or both, may be based on a reduction of over 20% in the mean intensity values of each one of the RGB channels when compared to predefined reference values, as described in further detail hereinabove.

The mean intensity values may be calculated per the whole area of the captured 210 image occupied by the reflected predefined pattern, or specifically per each one of one or more parts of the area occupied by the reflected pattern, as described in further detail hereinabove.

Thus, in one example, the predefined pattern is white and blank, and the mean intensity values calculated for the RGB Red, Green, and Blue channels are rounded to the nearest integer.

In the example, when the calculated mean intensity values for the Red, Green, and Blue channels are below 80% of the predefined reference values, or below 80% of the maximum intensity possible with the image capture device, there is identified 230 the property of having the AR coating, AR filter, or both.

For example, when the image capture device is an eight bit digital camera and the distance between the image capture device and the lens is small enough (say less than 40 centimeters), the device's maximal intensity value of 255 (in the 0-255 range possible with eight bits) is likely to be the maximal intensity actually measured.

Consequently, in the example, when all or a predefined one or more of the RGB channel mean intensity values is lower than say 204 (i.e. 80% of 255), there is identified 230 the property of the lens having the AR coating, AR filter, or both the coating and the filter.

However, with a longer distance, the maximal intensity actually measured may be lower. In one example, the maximal intensity actually measured is 220, and consequently, in the example, when all or a predefined one or more of the RGB channel mean intensity values is lower than say 176, there is identified 230 the property of the having the AR coating, AR filter, or both the coating and the filter.

Optionally, the analyzing 220 further includes identifying a predefined deformation along a virtual segment within the reflected pattern, say a linear segment which extends between two points inside a blank part of the reflected pattern, as described in further detail hereinabove.

Based on the identified deformation of the virtual segment, there may be identified 230 one or more properties of the lens, as described in further detail hereinbelow.

In a first example, the deformation includes an unexpected discontinuity of the virtual segment (say a fragmentation of the segment into two or more sub-segments). In the first example, based on that unexpected discontinuity, there may be identified 230 a property—say a peeling of coating on the lens or a presence of one or more cracks on the lens.

In a second example, the deformation includes a change in curvature of the virtual segment (say a sinusoidal form or a form involving a high frequency of changes when expected to be straight). In the example, based on that change in curvature, there may be identified 230 a property—say a topographical irregularity of the lens.

Optionally, the exemplary method further includes projecting the predefined pattern from a light source (say a one in use by the user), onto the lens, say from a slide projector, a computer screen, a screen of a mobile phone (say an Apple iPhone® smart phone), a flashlight, an indoor or other light (say through a slide which bears the pattern), etc.

Optionally, the predefined pattern is projected from the light source, by the pattern projector of apparatus 1000. The pattern projector may be implemented, for example, on the user's computer, on a remote computer in communication with the user's computer or with the light source, or on both computers, etc., as described in further detail hereinabove.

Thus, in a first example, the exemplary method includes a preliminary step of projecting the predefined pattern from a screen of a mobile phone in use by the user, onto the lens.

Optionally, in the first example, the user holds the mobile phone against a pair of eyeglasses worn by the user, with the mobile phone's screen facing the user's face, simultaneously to presentation of the pattern on the mobile phone's screen.

Consequently, the pattern is projected onto the lens from which the pattern reflects back.

Then, there is captured an image of the predefined pattern reflected from the lens, using the mobile phone camera, either manually—say as the user clicks on a button presented in a GUI, on the phone's screen, or automatically upon alignment of the reflected pattern in a predefined way, as described in further detail hereinbelow.

Alternatively, in the first example, the user may rather place the eyeglasses opposite the mobile phone, say on a table, and simultaneously to presentation of the pattern on the mobile phone's screen, capture an image of the predefined pattern reflected from the lens, using the mobile phone camera, as described in further detail hereinbelow.

In a second example, the exemplary method includes a preliminary step of projecting the predefined pattern from a computer screen in use by the user, onto the lens—say from a screen of the user's tablet computer, laptop computer, etc.

Optionally, in the second example, the user holds the computer, with the computer's screen facing a pair of eyeglasses worn by the user, simultaneously to presentation of the pattern on the computer's screen, thus projecting the pattern onto the lens from which the pattern reflects back. Then, the user captures an image of the predefined pattern reflected from the lens, using the computer's camera, as described in further detail hereinbelow.

Alternatively, in the second example, the user may rather place the eyeglasses opposite the computer's screen, say on a table, and simultaneously to presentation of the pattern on the computer's screen, capture an image of the predefined pattern reflected from the lens, using the computer' camera, as described in further detail hereinbelow.

Optionally, in the method, the predefined pattern is projected with a marking usable by the user for aligning the lens in a predefined orientation prior to capturing 210 the image of the pattern reflected from the lens, as described in further detail hereinbelow, and as illustrated, for example, in FIG. 5 and FIG. 6.

Optionally, in the method, the predefined pattern is projected with a texture that has a directional aspect usable by the user for aligning the lens in a predefined orientation prior to capturing 210 the image of the pattern reflected from the lens, as described in further detail hereinbelow, and as illustrated, for example, in FIG. 7.

Optionally, the method further includes a preliminary step in which color selection for one or more parts of the predefined pattern is optimized according to technical characteristics of the image capture device—say a digital camera, of a device used for projecting the pattern onto the lens—say a digital screen, or of both devices.

The light emission difference among different digital screens, is now explained with reference being made to FIG. 3, which is a simplified diagram schematically illustrating an exemplary graph depicting an emission spectrum of one exemplary digital screen.

Digital screens such as Liquid Crystal Display (LCD) computer and smart phone screens may differ in their emission spectra. Those screens are often characterized as tri-chromatic light sources that emit light using three basic types of tiny light sources also referred to as sub-pixels—Red, Green, and Blue.

For each digital screen, a graph depicting intensity of the light emitted from the digital screen, usually peaks at a first wavelength that is in the range of red light (~570-700 nm), at a second wavelength that is in the range of green light (~500-580 nm), and at a third wavelength that is in the range of blue light (~430-490 nm).

However, for each different screen model, the graph usually peaks at a different first (i.e. red light) wavelength, a different second (i.e. green light) wavelength and a different third (i.e. blue light) wavelength.

Thus, for one exemplary digital screen, the graph 3000 has a first peak 310 at a wavelength within the ~570-700 nm range of red light, a second peak 320 at a wavelength within the ~500-580 nm range of green light, and a third peak 330 at a wavelength within the ~430-490 nm range of blue light.

The light sensitivity difference among different digital cameras is now explained with reference being made to FIG. 4, which is a simplified diagram schematically illustrating an exemplary set of three graphs, depicting sensitivity of a digital camera for three primary colors.

A stills camera or a video camera usually includes many small sensors such as CMOS (Complementary Metal Oxide Semiconductor) sensors or CCD (Charge Coupled Device) sensors.

Those small sensors are used for capturing the image, and have different sensitivity for each one of the Red, Green, and Blue primary colors, respectively.

However, the sensitivity of the sensors to each one of the primary colors also varies among different models of digital cameras.

Consequently, for a different camera model (or other image capture device model), the peak of sensitivity for each one of the three types is usually different.

Thus, for one camera model, a graph 4100 depicting the sensitivity of red light sensors picks 410 at a first wavelength, a graph 4200 depicting the sensitivity of green light sensors picks 420 at a second wavelength, and a graph 4300 depicting the sensitivity of blue light sensors peaks 430 at a third wavelength.

However, for a different camera model, each one of the three graphs 4100-4300 may be different and pick at a different wavelength.

An exemplary optimization of color selection for different parts of a predefined pattern, according to technical characteristics of an image capture device—say a digital camera, of a device used for projecting the pattern—say a digital screen, or of both devices, is now explained with reference being made to FIG. 5.

FIG. 5 is a simplified diagram schematically illustrating an exemplary radial predefined pattern, according to an exemplary embodiment of the present invention.

An exemplary radial pattern 5000 illustrated using FIG. 5 is a round pattern that has two or more parts 501-512 arranged around a center of the pattern 5000, and more specifically, around a round central area 500 of the pattern 5000.

Optionally, the pattern 5000 is a colored pattern, alternatively the pattern is rather non-colored, or rather a pattern that includes one or more colored parts and one or more parts that are not colored (say one or more grayscale or white parts).

Optionally, the pattern 5000 is radially symmetric—i.e. symmetric with respect to the center of the pattern 5000, such that parts 501-512 positioned opposite each one, on opposite sides of the pattern's 5000 center have the same color and texture. In one example, the radially symmetric pattern may be projected on both lenses of a pair of eyeglasses (while crossing other face parts), such that the pattern's part projected on one lens is symmetric to the pattern's part projected on another lens, and a comparison between the two parts reveals a difference between the lenses.

In one example, the predefined pattern 5000 is a colored pattern designed with a color selection that corresponds to the wavelengths at which light emitted from a digital screen used to project the pattern onto a lens, peaks, as described in further detail hereinabove.

Thus, in the example, some of the slices 501-512 of the exemplary radial pattern 5000 may be designed with colors that much the maximal hue values for the basic colors (Blue, Green and Red) possible with the digital screen in use.

Optionally, some of the slices 501-512 may be based on color combinations that are halfway between those hue values, say half tones, as known in the art.

Thus, each slice 501-512 in the predefined radial pattern 5000 is designed with a respective, predefined color, and a respective, predefined position within the pattern.

Alternatively or additionally, the color selection made with respect to the slices 501-512 of the exemplary radial pattern 5000, may similarly take into consideration the wavelengths at which the sensitivity graphs of the image capture device (say a digital camera) peak, as described in further detail hereinabove.

The exemplary radial pattern 5000 further includes a marking 550 which extends from the central area 500 of the pattern 5000 on which a cross forming a first end of the mark is shown in FIG. 5, to the right.

The marking 550 may be used for automatically identifying the orientation of the pattern 5000 when projected onto the lens, guide the user in aligning the pattern 5000 in a specific orientation, etc., as described in further detail hereinbelow.

Further, the marking 550 reveals the location of each specific one of the slices 501-512, since the order of placement of the specific part in the pattern 5000, with respect to the marking 550 is known. Consequently, the marking 550 allows an analysis 220 of the pattern 5000 when captured 210 in the image, by comparing each one of the slices 501-512 as captured 210 in the image and the color selection for that part (say the hue values).

With reference being made back to FIG. 2A, it is noted that the predefined pattern (whether that of FIG. 5, that of FIG. 6 or any other predefined pattern), may be designed in various ways.

For example, the predefined pattern may be colored, non-colored (say grayscale), or rather a one that has one or more colored parts and one or more non-colored (say grayscale or white) parts, as described in further detail hereinabove Optionally, the predefined pattern may be blank, non-blank (say a one with graphical or textual content), or rather a one that has one or more blank parts and one or more non-blank parts.

Optionally, the predefined pattern includes two or more parts of different color, color level (say grey level) or texture, and each part has a respective, predefined color, color level or texture, and a respective, predefined position within the pattern.

Consequently, the analysis 220 of the captured 210 image may be based on the color, color level or texture of at least one of the parts, and on the part's position within the pattern.

In one example, the predefined pattern is a radial pattern that has two or more parts of different color, arranged around a center of the predefined pattern, as described in further detail hereinabove, and as illustrated, for example, in FIG. 5.

In the example, each part has respective, predefined color and order of placement around the center, and the analysis 220 of the captured 210 images is based on the respective predefined order of placement of at least one of the parts, and on the part's color, say through the comparisons described in further detail hereinabove.

Optionally, the predefined pattern includes one or more predefined markings.

In one example, when the pattern aligns in a preferred orientation, the marking aligns in a predefined way. For example, when the exemplary pattern 5000 illustrated in FIG. 5 aligns in a preferred orientation, the marking 550 extends rightward from the center of the radial pattern 5000, as illustrated in FIG. 5.

In other cases, the markings, may include, for example a number, an arrow, a cross, a line, words, letters, etc., as described in further detail hereinbelow.

Thus, in a second example, illustrated with reference being made to FIG. 6 which is a simplified diagram schematically illustrating a first exemplary planner predefined pattern, according to an exemplary embodiment of the present invention, the marking includes a cross mark 610 that is adjacent to one of pattern's 6000 angles.

With reference being made back to FIG. 2A, it is noted that one or more of the markings may be used by the user to align a device used to project the pattern with respect to the lens, such that the projected, predefined pattern aligns on the lens in a predefined way, as described in further detail hereinbelow.

Additionally or alternatively, the markings may be automatically identified and located in the captured 210 image, and once identified and located, the located markings may be used to automatically identify an orientation of the reflected pattern, identify the reflected pattern's center, etc., as described in further detail hereinbelow.

Optionally, the orientation of the reflected pattern may rather be identified based on a directional aspect of a general texture of the predefined pattern.

Thus, in one example, illustrated with reference being made to FIG. 7 which is a simplified diagram schematically illustrating a second exemplary planner predefined pattern 7000, according to an exemplary embodiment of the present invention, the orientation of the pattern 7000 may be identified based on the orientation of the stripes 710.

Further, the user himself may use the texture's directional aspect, for aligning the lens in a predefined (say by a programmer or operator) preferred orientation with respect to the image capture device, say into a position in which the pattern 7000 is captured 210 using the image capture device, with the stripes 710 aligned vertically.

Returning to FIG. 2A, it is noted that optionally, an identifying of the pattern's orientation, center, or both, may be used for analyzing 220 the captured 210 image, for guiding the user in aligning the eyeglasses and image capture device (say by moving his mobile phone) in a specific way, etc., as described in further detail hereinbelow.

Thus, optionally, the method further includes locating a predefined marking which appears on the reflected pattern as captured 210 in the image, and when identifying alignment of the predefined marking in a predefined orientation, automatically initiating the analyzing 220, as described in further detail hereinbelow.

Optionally, the method further includes locating a predefined part of the pattern, say the round area 550 around the center of the radial pattern 5000 illustrated in FIG. 5, and automatically initiating the analyzing 220 upon a predefined alignment (say a positioning) of the part—say a positioning over a predefined area of the lens, etc., as described in further detail hereinbelow.

Optionally, only upon identifying the alignment in the predefined orientation, is the analyzing 220 initiated.

Figure 8:
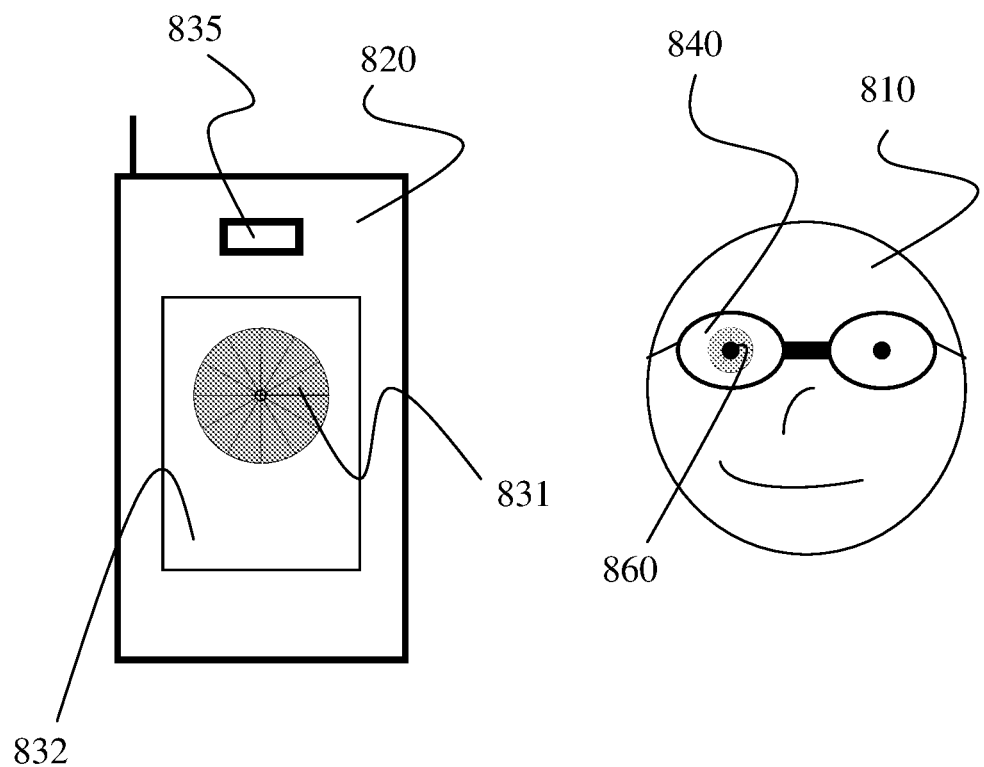
FIG. 8 is a block diagram schematically illustrating an exemplary scenario of self-administrated testing of eyeglasses, according to an exemplary embodiment of the present invention.

Reference is now made to FIG. 8, which is a block diagram schematically illustrating an exemplary scenario of self-administrated testing of eyeglasses, according to an exemplary embodiment of the present invention.

In one example, as the user 810 moves the user's mobile phone 820 over the user's eyeglasses, the apparatus 1000 (say the iPhone™ App using the phone's video camera) continuously captures images of the eyeglasses simultaneously to presentation of the pattern 831 on the mobile phone's screen 832.

In the example, as the user moves the mobile phone 820 just over one of the lenses 840 installed on the user's eyeglasses, the predefined pattern 831 is projected from the phone's screen 832 onto the lens 840 and is reflected from the lens 840.

When a predefined marking which appears on the pattern as reflected from the lens 840 aligns into a predefine position—say into a specific orientation with respect to the pattern's center, the last image captured 210 by the phone's 820 video camera 835 is forwarded for analysis 220, thus initiating the analysis step 220. Based on the analysis 220, one of more properties of the lens may be identified 230, as described in further detail hereinabove.

For example, the position may be a one in which the marking extends horizontally from the center of the pattern to the right, as illustrated in FIG. 5, a one in which a marking or part (say the central area 500) of the predefined pattern known to mark the pattern's center overlaps one of the user's 810 pupils 860, or a one having both that overlap and that extension.

The location of the marking and the identifying of the marking's orientation may thus reveal the pattern's orientation.

Returning to FIG. 2A, it is noted that the marking, the part known to mark the pattern's center, or both, may be located in the image using image processing or machine learning methods such as Pattern Matching, Daugman Integro-Differential Operators, Hough Transformation for circle detection, etc., as known in the art.

Optionally, the identifying of the alignment of the marking which appears on the reflected pattern in the predefined orientation may be carried out automatically, say using OCR (Optical Character Recognition)—for example, for identifying an arrow pointing up or the word 'Left' on the pattern, or by recognizing a line or another mark on the reflected pattern.

Thus, optionally, the center of the reflected pattern, the orientation of the reflected pattern, or both, may be identified automatically, as described in further detail hereinabove.

Additionally or alternatively, the center of the reflected pattern, the orientation of the reflected pattern, or both, may be identified manually by the user, say through a GUI (Graphical User Interface) that allows the user to manually mark the center or orientation, as described in further detail hereinbelow.

Thus, in one example, real time video images of the reflected pattern as captured using the image capture device (say a video camera) of the user's mobile phone or tablet computer, is presented on a touch screen of the tablet computer or phone.

In the example, simultaneously to presentation of the video images, the user is allowed to mark the pattern's center by touching the screen, mark an orientation of the pattern using a multi-touch gesture in which the user moves two fingers in a predefined way while touching the screen, etc., as known in the art of multi-touch gesture recognition.

Subsequently to the marking by the user or the automatic identifying of the center, alignment, or both the center and the alignment, the captured 210 images may be analyzed 220, and one or more properties of the lens may be identified 230 (say by the property identifier 130), as described in further detail hereinabove.

Optionally, the one or more images are captured 210 when the eyeglasses are worn by the user, and the method further includes locating a facial feature (say a pupil, nose, etc.) of the user in the captured 210 one or more images and using the located facial feature in further steps of the analysis 220.

In one example, the analyzing 220 may include verifying that the reflected pattern as captured 210 in the image appears to be symmetric with respect to the user's pupil, etc., say for verifying the projection of the predefined pattern onto a generally central area of the lens before carrying out a specific part of the analysis 220.

In a second example, the analyzing 220 may include using a size of the pupil, nose or other facial feature located in the captured 210 image, for estimating the location of point of discontinuity on the lens. For example, the location of the point may be estimated by multiplying the distance of the point from a screw that connects the lens to the eyeglasses' bridge in the captured 210 image by a ratio. The ratio is calculated by dividing a known real world size of the facial feature (say a typical size of an adult's pupil) by the size of the face feature in the captured 210 image.

Optionally, a video stream made of one or more images is captured when the eyeglasses are worn by the user, and one of the user's facial feature is located in one of the video stream's images. Then, the located facial feature may be used for guiding the user in aligning the image capture device and the eyeglasses in a preferred position—say in a specific orientation with respect to each other, as described in further detail hereinbelow.

Thus, in one example, the user is guided to move the mobile over the lens, with the phone's camera facing the eyeglasses, to the right, to the left, etc., until the predefined pattern as projected onto one the eyeglasses' lens aligns in a predefined position with respect to one of the user's pupil, the user's nose, etc.

The user may be guided for example, using vocal instructions given on the mobile phone's speaker, using a GUI implemented using titles with instructions, arrows, etc. or other cues that appear on the video images captured and presented on the phone's screen as the user moves the mobile phone over the eyeglasses, etc.

Optionally, the method further includes locating one or more boundaries of the eyeglasses' lenses in the captured 210 image.

For example, the one or more boundaries may be located using known in the art edge detection techniques such as Canny Edge Detection, an analysis of Oriented Gabor Filter Responses, etc., or any combination thereof.

Optionally, the located boundaries are used for guiding the user in aligning the image capture device (say the phone's camera) and the eyeglasses with respect to each other, say in a preferred position in which the pattern is projected on a preferable area of one the lenses, as described in further detail hereinbelow.

Optionally, the method further includes estimating location of the lens center in the captured 210 image.

For example, the estimating may be based on a mass center of the lens as calculated based on the location of the one or more boundaries, on intersection of a virtual vertical line positioned where the height of the lens is maximal with a virtual horizontal line positioned where the width of the lens is maximal, etc., or any combination thereof. The horizontality and verticality of the lines may be selected, for example, so as to be parallel to the horizontal side and vertical side of a smallest rectangle that would bound the located boundaries of lens, as known in the art.

Optionally, the estimated location of the lens center may be used in analyzing 220 the captured 210 image, say for limiting the analysis 220 to a predefined central area of the lens.

Optionally, the estimated location of the lens center may be used for guiding the user in aligning the image capture device and the eyeglasses with respect to each other, say in a preferred position in which the pattern is projected on a preferable area of one of the lenses, as described in further detail hereinbelow.

Optionally, the method further includes automatically locating a center of the reflected pattern, and using the located center in further steps of the analysis 220, as described in further detail hereinbelow.

Optionally, the located center of the reflected pattern is used for guiding the user in aligning the image capture device and the eyeglasses with respect to each other, say in a preferred position in which the pattern is projected on a preferable area of one of the lenses, as described in further detail hereinbelow.

Thus, in one example, a GUI implemented using live video images captured 210 by the user's mobile phone video camera as the user moves the mobile phone over the eyeglasses, presents the captured video images to the user in real time, as the user moves the mobile phone over the eyeglasses.

In the example, when the located center of the reflected pattern and the estimated location of the lens center—as captured in the video images, are close enough, say within a predefined distance from each other (say a distance of less than 1% of the width of each one of the video images), the lens edges are colored green. However, when the located center of the reflected pattern and the estimated location of the lens—as captured in the video images, are not close enough, the lens edges are colored red.

Further in the example, when the edges are colored green, the last image captured 210 by the phone's video camera is forwarded for analysis 220, thus initiating the analysis step 220. However, when the edges are colored red, an arrow presented on the phone's screen, guides the user to move the phone or eyeglasses in a direction necessary for aligning the phone's video camera and the eyeglasses in a preferred position with respect to each other.

Optionally, the exemplary method further includes using face detection methods applied on the a video images—say for locating the user's face and facial features, using segmentation methods and\or tracking methods—say in order to automatically locate the vision glasses and lenses, etc., or any combination thereof.

Thus in a first example, the Viola-Jones cascade object detection algorithm and/or one or more other face detection methods, are applied on the video images captured 210 by the user's mobile phone or other computer, for locating the user's face and for identifying one or more facial features, as known in the art.

In a second example, since the human eyes are located on the upper half of the face, the image's region of interest (ROI) in which the eyes appear, may be located using the Viola-Jones cascade object detection algorithm, an eye corner detection method, a glint detection method, a pupil detection method, etc., as known in the art.

Optionally, in order to reduce computational complexity, the exemplary method further uses known in the art video tracking methods.

For example, the method may include updating the ROI in which the eyes appear according to head and eye movement of the user as captured 210 in the image.

In the example, there is further applied a segmentation method on the ROI, say in order to locate the specific area on which the predefined pattern appears within the ROI in which the eyes appear, or for locating one or more of the markings that may appear on the predefined pattern, as described in further detail hereinabove.

Optionally, one or more of the above mentioned Viola Jones, face detection, segmentation, and tracking methods are further used to guide the user with the GUI, as described in further detail hereinabove.

For example, the methods may be used for locating the lens boundaries, lens and reflected pattern centers, face features, etc., and based on that locating, guide to user to move the image capture device and lens into a predefined position with respect to each other, as described in further detail hereinabove.

Figure 2B:
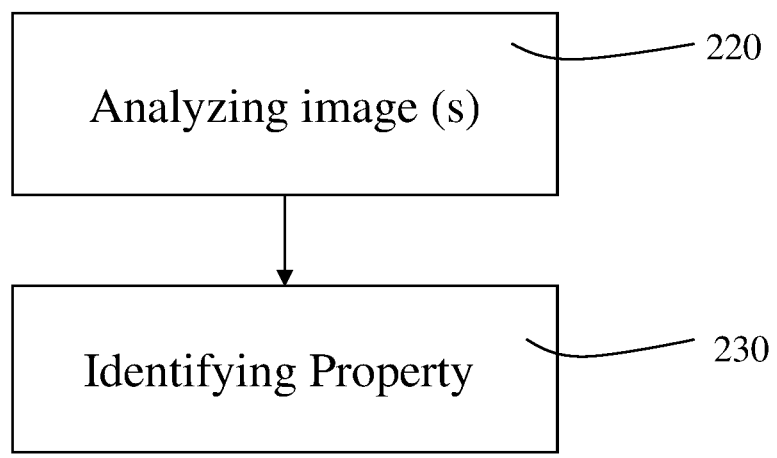
FIG. 2B is a flowchart illustrating a second exemplary computer implemented method for self-administrated testing of eyeglasses, according to an exemplary embodiment of the present invention.

Reference is now made to FIG. 2B, which is a flowchart illustrating a second exemplary computer implemented method for self-administered testing of eyeglasses, according to an exemplary embodiment of the present invention.

An exemplary method for self-administered testing of eyeglasses, according to an exemplary embodiment of the present invention, is implemented on a computer.

The computer may actually include one or more computers, such as a smart phone, a tablet computer or another computer—in use by a user who wears a pair of eyeglasses (say sunglasses or other eyeglasses), a server computer in communication with the computer in use by the user, another computer, etc. or any combination thereof.

The exemplary method may be implemented by programming the computer, say by uploading computer executable instructions from a computer readable medium, etc., as known in the art.

In a first example, the whole steps of analyzing 220 and identifying 230, as described in further detail hereinbelow, are carried out on a first computer (say the server computer).

In a second example, the first computer rather communicates with a second computer, say a remote computer (say the user's mobile phone or another computer), for carrying out one or more parts of the method steps. Thus, in the second example, at least a part of the below described steps of analyzing 220 and identifying 230, is carried out on the second computer (say the eyeglasses user's mobile phone or tablet computer in communication with computer).

Thus, the second exemplary method includes the steps of analyzing 220 one or more captured images and identifying 230 at least one property of a lens of the user's eyeglasses, using one or more of the one or more captured images as described in further detail for the first exemplary method hereinabove.

Optionally, the second exemplary method further includes a step (not shown) of receiving one or more images of a predefined pattern reflected from at least one lens of a pair of eyeglasses of a user, say from a computer (say a mobile phone or a tablet computer) in use by the user of the pair of eyeglasses or another person, for capturing the images.

The one or images may be received, for example, over the internet, an intranet network, a LAN (Local Area Network), a wireless network, another communication network or channel, or any combination thereof, as known in the art.

Optionally, the second method further includes one or more additional steps as described in further detail for the first method hereinabove.

For example, the second method may include the capturing 210 of one or more images, identifying one or more facial features, guiding the user, identifying orientation, etc., or any combination thereof, each of which steps may be implemented on the first computer, second computer, or both.

Optionally, in the second method, the step of capturing 210 is carried out on the first computer, say by remotely controlling an image capture device (say a mobile phone camera) in use by the user, for capturing 210 the one or more images.

Figure 9A:
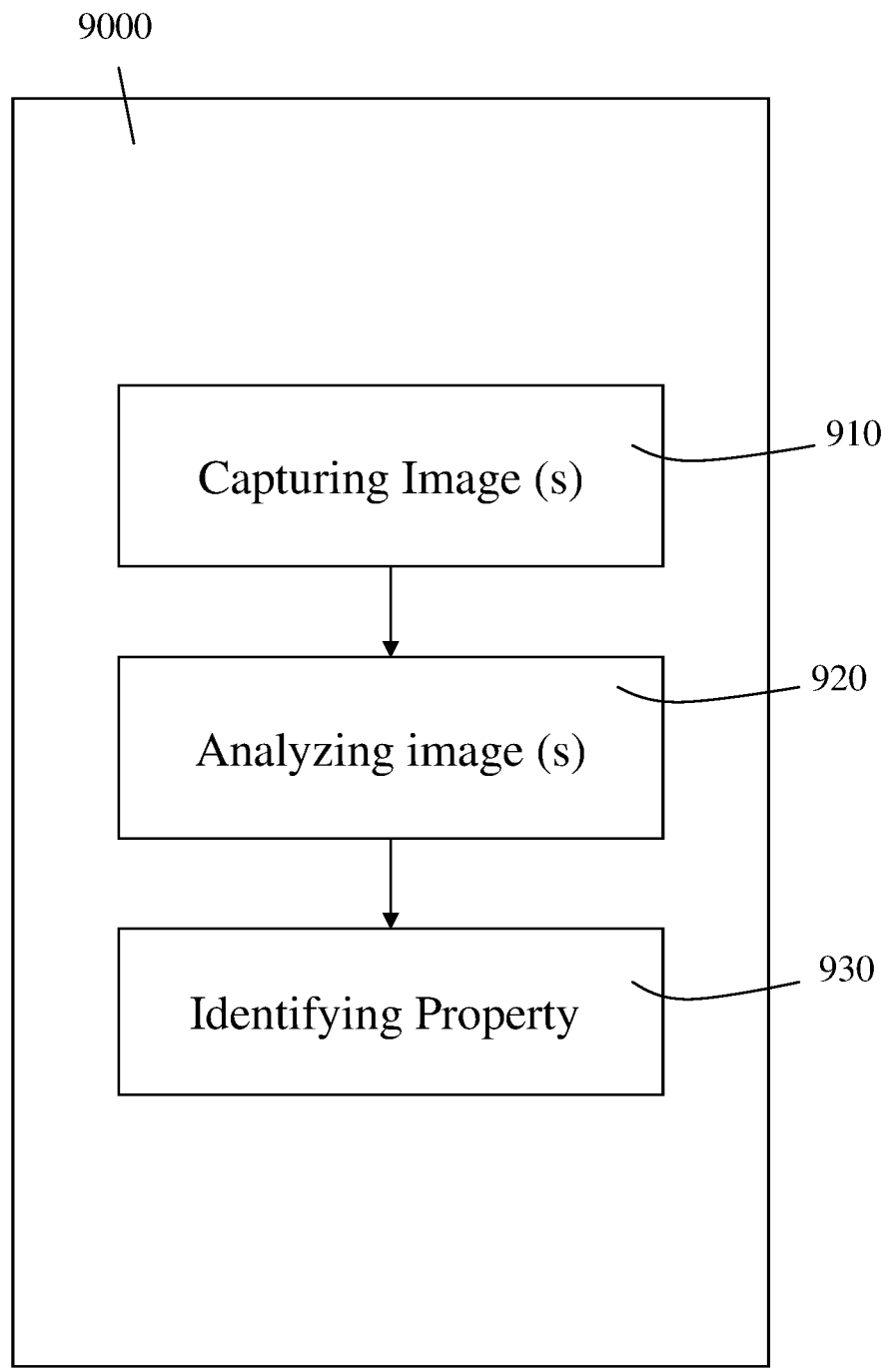
FIG. 9A is a block diagram schematically illustrating a first exemplary computer readable medium storing computer executable instructions for performing steps of self-administrated testing of eyeglasses, according to an exemplary embodiment of the present invention.

Reference is now made to FIG. 9A, which is a block diagram schematically illustrating a first exemplary computer readable medium storing computer executable instructions for performing steps of self-administrated testing of eyeglasses, according to an exemplary embodiment of the present invention.

According to an exemplary embodiment of the present invention, there is provided a non-transitory computer readable medium 9000 which stores computer executable instructions for performing steps of self-administrated testing of eyeglasses on one or more computers, say on a mobile phone or a tablet computer.

The computer readable medium 9000 may include, but is not limited to: a RAM (Rapid Access Memory), a DRAM (Dynamic RAM), a ROM (Read Only Memory), a PROM (Programmable ROM), an EPROM (Erasable ROM), a Micro SD (Secure Digital) Card, a CD-ROM, a Solid State Drive (SSD), a USB-Memory, a Hard Disk Drive (HDD), etc., as known in the art.

The computer readable medium 9000 stores computer executable instructions, for performing steps of the first exemplary method for self-administrated testing of eyeglasses, as described in further detail hereinabove and illustrated using FIG. 2A.

For example, the medium 9000 stores computer executable instructions 910 for performing the capturing 210 step of the method, computer executable instructions 920 for performing the analyzing 220 step of the method, and computer executable instructions 930 for performing the property identifying 230 step of the method.

The instructions may be executed upon one or more computer processors of a computer in use by the user for testing the user's eyeglasses, on a remote computer in communication with the computer in use by the user (say a remote server computer), on another computer, etc., or any combination thereof, as described in further detail hereinabove.

The computer used by the user may be for example, a smart phone (say an Apple® iPhone or a Samsung® Galaxy cellular phone), a tablet computer (say an Apple® iPad), etc.

For example, the instructions may be in a form of a computer application such an iPhone® App, which may be downloaded to the user's smart phone (say Apple® iPhone), stored on the computer readable medium 9000 (say on the phone's ROM), and executed on the phone's processor.

Figure 9B:
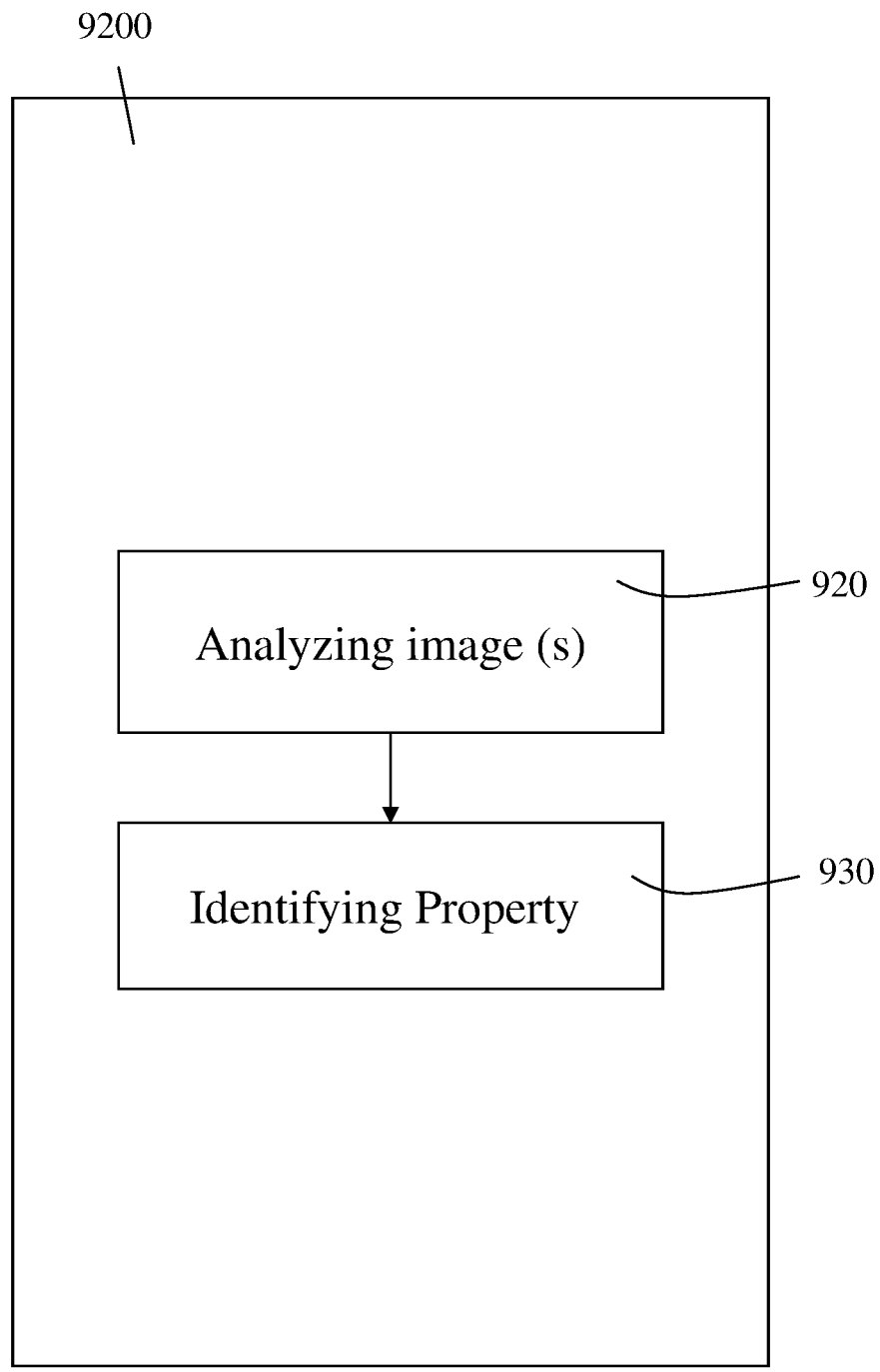
FIG. 9B is a block diagram schematically illustrating a second exemplary computer readable medium storing computer executable instructions for performing steps of self-administrated testing of eyeglasses, according to an exemplary embodiment of the present invention.

Reference is now made to FIG. 9B, which is a block diagram schematically illustrating a second exemplary computer readable medium storing computer executable instructions for performing steps of self-administrated testing of eyeglasses, according to an exemplary embodiment of the present invention.

According to an exemplary embodiment of the present invention, there is provided a non-transitory computer readable medium 9200 which stores computer executable instructions for performing steps of self-administrated testing of eyeglasses on one or more computers, say on a mobile phone or a tablet computer.

The computer readable medium 9200 may include, but is not limited to: a RAM (Rapid Access Memory), a DRAM (Dynamic RAM), a ROM (Read Only Memory), a PROM (Programmable ROM), an EPROM (Erasable ROM), a Micro SD (Secure Digital) Card, a CD-ROM, a Solid State Drive (SSD), a USB-Memory, a Hard Disk Drive (HDD), etc., as known in the art.

For example, the medium 9200 stores computer executable instructions 920 for performing the analyzing 220 step of the method, and computer executable instructions 930 for performing the property identifying 230 step of the method.

The computer readable medium 9200 stores computer executable instructions, for performing steps of the second exemplary method for self-administrated testing of eyeglasses, as described in further detail hereinabove and illustrated using FIG. 2B.

The instructions may be executed upon one or more computer processors of one or more first computers—say on a server computer, on a remote computer in communication with the first computer (say the server computer) and in use by the user for testing his eyeglasses, or on both, as described in further detail hereinabove.

For example, the instructions may be in a form of a computer application which may be downloaded to the computer, the user's smart phone (say Apple® iPhone), stored on the computer readable medium 9200, and executed on the one or more processors.

It is expected that during the life of this patent many relevant devices and systems will be developed and the scope of the terms herein, particularly of the terms "Computer", "Tablet Computer", "Mobile Phone", "Smart Phone", "Screen", "Camera", "LCD", "CCD", and "CMOS", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer implemented method for self-administrated testing of eyeglasses, the method comprising computer performed steps, the steps comprising:
    analyzing at least one image of a predefined pattern reflected from at least one lens of a pair of eyeglasses of a user; wherein the predefined pattern comprises a plurality of parts, each part having a respective, predefined color and at least one of:
    a respective predefined position within the pattern; and
    a respective predefined order of placement around a center of the predefined pattern about which the plurality of parts are arranged,
    wherein said analyzing is based on the respective predefined color and on said at least one of the respective predefined position and the respective predefined order of placement of at least one of the parts; and
    identifying a property of the lens based on said analyzing of the predefined pattern reflected from the lens.

2. The method of claim 1, wherein the property is at least one of the group consisting of having a predefined coating and having a predefined filter.

3. The method of claim 1, wherein the property is at least one of the group consisting of having an Anti-Reflection (AR) coating and having an AR filter.

4. The method of claim 1, wherein the property is at least one of the group consisting of having a High Energy Visible (HEV) light protective coating and having a HEV light protective filter.

5. The method of claim 1, further comprising projecting the predefined pattern from a light source in use by the user onto the lens.

6. The method of claim 5, wherein said light source being at least one of: a screen of a computer in use by the user, and a screen of a mobile phone.

7. The method of claim 5, further comprising optimizing color selection for at least a part of the predefined pattern according to technical characteristics of an image capture device intended to be used for capturing the image, a device intended to be used for projecting the pattern onto the lens, or of both of the devices.

8. The method of claim 1, further comprises identifying a predefined deformation along a virtual segment within the reflected pattern as captured in the image.

9. The method of claim 1, further comprising automatically identifying an orientation of the reflected pattern as captured in the image, by using at least one of a predefined marking appearing on the reflected pattern, and a directional aspect of a texture of the reflected pattern.

10. The method of claim 1, further comprising projecting the predefined pattern with at least one of:
    a marking usable by the user for aligning the pair of eyeglasses and an image capture device used to capture the image with respect to each other;
    a texture having a directional aspect usable by the user for aligning the pair of eyeglasses and an image capture device used to capture the image with respect to each other.

11. The method of claim 1, further comprising identifying alignment of the reflected predefined pattern as captured in the image in a predefined orientation, and automatically initiating said analyzing upon said identifying of the alignment in the predefined orientation.

12. The method of claim 1, further comprising guiding the user in aligning the pair of eyeglasses and an image capture device used to capture the image with respect to each other.

13. The method of claim 12, further comprising at least one of the following:
- capturing the image while the user is wearing the pair of eyeglasses, locating a facial feature of the user in the captured image, and using the located facial feature for said guiding of the user;
- locating a boundary of a lens of the pair of eyeglasses in the image and using the located boundary for said guiding of the user;
- automatically estimating a location of a center of a lens of the eyeglasses in the image, and using the estimated location for said guiding of the user;
- automatically locating a center of the reflected pattern in the image, and using the located center for said guiding of the user.

14. The method of claim 1, further comprising locating a boundary of a lens of the pair of eyeglasses in the image.

15. The method of claim 1, further comprising automatically estimating a location of a center of a lens of the eyeglasses in the image.

16. The method of claim 1, further comprising automatically locating a center of the reflected pattern in the image.

17. An apparatus for self-administered testing of eyeglasses, the apparatus comprising:
- a computer,
- an image analyzer, implemented on said computer, configured to analyze at least one image of a predefined pattern reflected from at least one lens of a pair of eyeglasses of a user; and
- a property identifier, in communication with said image analyzer, configured to identify a property of the lens based on the analyzed image,
wherein the predefined pattern comprises a plurality of parts, each part having a respective, predefined color and at least one of:
- a respective predefined position within the pattern; and
- a respective predefined order of placement around a center of the predefined pattern about which the plurality of parts are arranged; and
- wherein analyzing said at least one image is based on the respective predefined color and on said at least one of the respective predefined position and the respective predefined order of placement of at least one of the parts.

18. The apparatus of claim 17, further comprising at least one of:
- an image capturer in communication with said image analyzer, configured to capture the image; and
- an image receiver in communication with said image analyzer, configured to receive the image.

19. A non-transitory computer readable medium storing computer executable instructions for performing the steps of the computer implemented method for self-administrated testing of eyeglasses, according to claim 1.

20. A computer implemented method for self-administrated testing of eyeglasses, the method comprising computer performed steps, the steps comprising:
- analyzing at least one image of a predefined pattern reflected from at least one lens of a pair of eyeglasses of a user; and
- identifying a property of the lens based on said analyzing;
- wherein the method further comprising at least one of the following:
  - (a) automatically identifying an orientation of the reflected pattern as captured in the image, by using at least one of: a predefined marking appearing on the reflected pattern, and a directional aspect of a texture of the reflected pattern; and
  - (b) projecting the predefined pattern with at least one of:
    - a marking usable by the user for aligning the pair of eyeglasses and an image capture device used to capture the image with respect to each other;
    - a texture having a directional aspect usable by the user for aligning the pair of eyeglasses and an image capture device used to capture the image with respect to each other.

21. An apparatus for self-administrated testing of eyeglasses, the apparatus comprising:
- a computer,
- an image analyzer, implemented on said computer, configured to analyze at least one image of a predefined pattern reflected from at least one lens of a pair of eyeglasses of a user; and
- a property identifier, in communication with said image analyzer, configured to identify a property of the lens based on the analyzed image;
- wherein said apparatus is further configured and operable for carrying out at least one of the following:
  - (a) automatically identifying an orientation of the reflected pattern as captured in the image, by using at least one of: a predefined marking appearing on the reflected pattern, and a directional aspect of a texture of the reflected pattern; and
  - (b) projecting the predefined pattern with at least one of:
    - a marking usable by the user for aligning the pair of eyeglasses and an image capture device used to capture the image with respect to each other;
    - a texture having a directional aspect usable by the user for aligning the pair of eyeglasses and an image capture device used to capture the image with respect to each other.

22. A non-transitory computer readable medium storing computer executable instructions for performing the steps of the computer implemented method for self-administrated testing of eyeglasses, according to claim 20.

* * * * *